(12) United States Patent
Paolini, Jr. et al.

(10) Patent No.: US 7,848,007 B2
(45) Date of Patent: ***Dec. 7, 2010

(54) ELECTROPHORETIC MEDIUM AND PROCESS FOR THE PRODUCTION THEREOF

(75) Inventors: Richard J. Paolini, Jr., Framingham, MA (US); David D. Miller, Wakefield, MA (US); Barrett Comiskey, Shanghai (CN); Joseph M. Jacobson, Newton Centre, MA (US); Bin Wu, Sharon, MA (US); Charles Howie Honeyman, Roslindale, MA (US); Jian Lin, Acton, MA (US)

(73) Assignee: E Ink Corporation, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/167,290

(22) Filed: Jul. 3, 2008

(65) Prior Publication Data

US 2008/0264791 A1 Oct. 30, 2008

Related U.S. Application Data

(60) Division of application No. 11/160,364, filed on Jun. 21, 2005, now Pat. No. 7,411,719, which is a continuation-in-part of application No. 10/906,075, filed on Feb. 2, 2005, now Pat. No. 7,079,305, which is a division of application No. 09/683,903, filed on Feb. 28, 2002, now Pat. No. 6,866,760, which is a continuation-in-part of application No. 10/329,023, filed on Dec. 24, 2002, now Pat. No. 7,109,968, which is a continuation of application No. 09/140,846, filed on Aug. 27, 1998, now Pat. No. 6,727,881.

(60) Provisional application No. 60/277,079, filed on Mar. 19, 2001, provisional application No. 60/277,391, (Continued)

(51) Int. Cl.
*G02B 26/00* (2006.01)
*G03G 17/04* (2006.01)
(52) U.S. Cl. .......................................... 359/296; 430/32
(58) Field of Classification Search ................. 359/296; 345/107; 430/32; 204/600
See application file for complete search history.

(56) References Cited

U.S. PATENT DOCUMENTS 2,932,629 A 4/1960 Wiley et al.
2,934,530 A 4/1960 Ballast et al.

(Continued)

FOREIGN PATENT DOCUMENTS

EP 0 443 571 A2 8/1991

(Continued)

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ: 2005.

*Primary Examiner*—William C Choi
(74) *Attorney, Agent, or Firm*—David J. Cole

(57) ABSTRACT

A two-phase electrophoretic medium comprises a continuous phase and a discontinuous phase. The discontinuous phase comprises a plurality of droplets, each of which comprises a suspending fluid and at least one particle disposed within the suspending fluid and capable of moving through the fluid upon application of an electric field to the electrophoretic medium. The continuous phase surrounds and encapsulates the discontinuous phase. To reduce the humidity sensitivity of the medium, a non-ionizable or crystalline polymer may be used as the continuous phase.

7 Claims, 22 Drawing Sheets

Related U.S. Application Data filed on Mar. 19, 2001, provisional application No. 60/057,133, filed on Aug. 28, 1997, provisional application No. 60/057,716, filed on Aug. 28, 1997, provisional application No. 60/057,122, filed on Aug. 28, 1998, provisional application No. 60/057,798, filed on Aug. 28, 1997, provisional application No. 60/057,799, filed on Aug. 28, 1997, provisional application No. 60/057,163, filed on Aug. 28, 1997, provisional application No. 60/057,118, filed on Aug. 28, 1997, provisional application No. 60/059,358, filed on Sep. 19, 1997, provisional application No. 60/059,543, filed on Sep. 19, 1997, provisional application No. 60/065,629, filed on Nov. 18, 1997, provisional application No. 60/065,630, filed on Nov. 18, 1997, provisional application No. 60/065,605, filed on Nov. 18, 1997, provisional application No. 60/066,147, filed on Nov. 19, 1997, provisional application No. 60/066,245, filed on Nov. 20, 1997, provisional application No. 60/066,246, filed on Nov. 20, 1997, provisional application No. 60/066,115, filed on Nov. 21, 1997, provisional application No. 60/066,334, filed on Nov. 21, 1997, provisional application No. 60/066,418, filed on Nov. 24, 1997, provisional application No. 60/070,940, filed on Jan. 9, 1998, provisional application No. 60/071,371, filed on Jan. 15, 1998, provisional application No. 60/072,390, filed on Jan. 9, 1998, provisional application No. 60/070,939, filed on Jan. 9, 1998, provisional application No. 60/070,935, filed on Jan. 9, 1998, provisional application No. 60/074,454, filed on Feb. 12, 1998, provisional application No. 60/076,955, filed on Mar. 5, 1998, provisional application No. 60/076,959, filed on Mar. 5, 1998, provisional application No. 60/076,957, filed on Mar. 5, 1998, provisional application No. 60/076,978, filed on Mar. 5, 1998, provisional application No. 60/078,363, filed on Mar. 18, 1998, provisional application No. 60/083,252, filed on Apr. 27, 1998, provisional application No. 60/085,096, filed on May 12, 1998, provisional application No. 60/090,223, filed on Jun. 22, 1998, provisional application No. 60/090,232, filed on Jun. 22, 1998, provisional application No. 60/092,046, filed on Jul. 8, 1998, provisional application No. 60/092,050, filed on Jul. 8, 1998, provisional application No. 60/093,689, filed on Jul. 22, 1998, provisional application No. 60/076,956, filed on Mar. 5, 1998, provisional application No. 60/081,362, filed on Apr. 10, 1998, provisional application No. 60/081,374, filed on Apr. 10, 1998, provisional application No. 60/090,222, filed on Jun. 22, 1998, provisional application No. 60/092,742, filed on Jul. 14, 1998.

(56) References Cited

U.S. PATENT DOCUMENTS

| | | | |
|---|---|---|---|
| 3,668,106 | A | 6/1972 | Ota |
| 3,756,693 | A | 9/1973 | Ota |
| 3,767,392 | A | 10/1973 | Ota |
| 3,792,308 | A | 2/1974 | Ota |
| 3,870,517 | A | 3/1975 | Ota et al. |
| 3,892,568 | A | 7/1975 | Ota |
| 4,418,346 | A | 11/1983 | Batchelder |
| 4,435,047 | A | 3/1984 | Fergason |
| 4,605,284 | A | 8/1986 | Fergason |
| 4,616,903 | A | 10/1986 | Fergason |
| 4,643,528 | A | 2/1987 | Bell, Jr. |
| 4,707,080 | A | 11/1987 | Fergason |
| 4,833,060 | A | 5/1989 | Nair et al. |
| 4,835,084 | A | 5/1989 | Nair et al. |
| 4,919,521 | A | 4/1990 | Tada et al. |
| 4,965,131 | A | 10/1990 | Nair et al. |
| 4,994,312 | A | 2/1991 | Maier et al. |
| 5,055,371 | A | 10/1991 | Lee et al. |
| 5,138,472 | A | 8/1992 | Jones et al. |
| 5,216,530 | A | 6/1993 | Pearlman et al. |
| 5,270,843 | A | 12/1993 | Wang |
| 5,351,143 | A | 9/1994 | Sato et al. |
| 5,354,799 | A | 10/1994 | Bennett et al. |
| 5,411,398 | A | 5/1995 | Nakanishi et al. |
| 5,463,491 | A | 10/1995 | Check, III |
| 5,463,492 | A | 10/1995 | Check, III |
| 5,530,567 | A | 6/1996 | Takei |
| 5,580,692 | A | 12/1996 | Lofftus et al. |
| 5,594,562 | A | 1/1997 | Sato et al. |
| 5,650,872 | A | 7/1997 | Saxe et al. |
| 5,700,608 | A | 12/1997 | Eshelman et al. |
| 5,745,094 | A | 4/1998 | Gordon, II et al. |
| 5,760,761 | A | 6/1998 | Sheridon |
| 5,777,782 | A | 7/1998 | Sheridon |
| 5,798,315 | A | 8/1998 | Etoh et al. |
| 5,808,783 | A | 9/1998 | Crowley |
| 5,872,552 | A | 2/1999 | Gordon, II et al. |
| 5,930,026 | A | 7/1999 | Jacobson et al. |
| 5,961,804 | A | 10/1999 | Jacobson et al. |
| 6,017,584 | A | 1/2000 | Albert et al. |
| 6,025,896 | A | 2/2000 | Hattori et al. |
| 6,054,071 | A | 4/2000 | Mikkelsen, Jr. |
| 6,055,091 | A | 4/2000 | Sheridon et al. |
| 6,067,185 | A | 5/2000 | Albert et al. |
| 6,097,531 | A | 8/2000 | Sheridon |
| 6,113,810 | A | 9/2000 | Hou et al. |
| 6,118,426 | A | 9/2000 | Albert et al. |
| 6,120,588 | A | 9/2000 | Jacobson |
| 6,120,839 | A | 9/2000 | Comiskey et al. |
| 6,124,851 | A | 9/2000 | Jacobson |
| 6,128,124 | A | 10/2000 | Silverman |
| 6,130,773 | A | 10/2000 | Jacobson et al. |
| 6,130,774 | A | 10/2000 | Albert et al. |
| 6,137,467 | A | 10/2000 | Sheridon et al. |
| 6,144,361 | A | 11/2000 | Gordon, II et al. |
| 6,147,791 | A | 11/2000 | Sheridon |
| 6,156,473 | A | 12/2000 | Tyagi et al. |
| 6,172,798 | B1 | 1/2001 | Albert et al. |
| 6,177,921 | B1 | 1/2001 | Comiskey et al. |
| 6,184,856 | B1 | 2/2001 | Gordon, II et al. |
| 6,215,540 | B1 | 4/2001 | Stephenson |
| 6,215,920 | B1 | 4/2001 | Whitehead et al. |
| 6,225,971 | B1 | 5/2001 | Gordon, II et al. |
| 6,232,950 | B1 | 5/2001 | Albert et al. |
| 6,241,921 | B1 | 6/2001 | Jacobson et al. |
| 6,249,271 | B1 | 6/2001 | Albert et al. |
| 6,252,564 | B1 | 6/2001 | Albert et al. |
| 6,262,706 | B1 | 7/2001 | Albert et al. |
| 6,262,833 | B1 | 7/2001 | Loxley et al. |
| 6,271,823 | B1 | 8/2001 | Gordon, II et al. |
| 6,300,932 | B1 | 10/2001 | Albert |
| 6,301,038 | B1 | 10/2001 | Fitzmaurice et al. |
| 6,312,304 | B1 | 11/2001 | Duthaler et al. |
| 6,312,971 | B1 | 11/2001 | Amundson et al. |
| 6,323,989 | B1 | 11/2001 | Jacobson et al. |
| 6,327,072 | B1 | 12/2001 | Comiskey et al. |
| 6,376,828 | B1 | 4/2002 | Comiskey |
| 6,377,383 | B1 | 4/2002 | Whitehead et al. |
| 6,377,387 | B1 | 4/2002 | Duthaler et al. |
| 6,392,785 | B1 | 5/2002 | Albert et al. |
| 6,392,786 | B1 | 5/2002 | Albert |
| 6,413,790 | B1 | 7/2002 | Duthaler et al. |
| 6,422,687 | B1 | 7/2002 | Jacobson |
| 6,445,374 | B2 | 9/2002 | Albert et al. |

| Patent No. | Date | Inventor(s) |
|---|---|---|
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,498,674 B1 | 12/2002 | Sheridon |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,518,949 B2 | 2/2003 | Drzaic |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,556,262 B1 | 4/2003 | Stephenson et al. |
| 6,580,545 B2 | 6/2003 | Morrison et al. |
| 6,639,578 B1 | 10/2003 | Comiskey et al. |
| 6,657,772 B2 | 12/2003 | Loxley |
| 6,664,944 B1 | 12/2003 | Albert et al. |
| 6,672,921 B1 | 1/2004 | Liang et al. |
| 6,680,725 B1 | 1/2004 | Jacobson |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,721,083 B2 | 4/2004 | Jacobson et al. |
| 6,724,519 B1 | 4/2004 | Comiskey et al. |
| 6,727,881 B1 | 4/2004 | Albert et al. |
| 6,750,473 B2 | 6/2004 | Amundson et al. |
| 6,753,999 B2 | 6/2004 | Zehner et al. |
| 6,788,449 B2 | 9/2004 | Liang et al. |
| 6,816,147 B2 * | 11/2004 | Albert .................. 345/107 |
| 6,822,782 B2 * | 11/2004 | Honeyman et al. .......... 359/296 |
| 6,825,068 B2 | 11/2004 | Denis et al. |
| 6,825,829 B1 | 11/2004 | Albert et al. |
| 6,831,769 B2 | 12/2004 | Holman et al. |
| 6,839,158 B2 | 1/2005 | Albert et al. |
| 6,842,279 B2 | 1/2005 | Amundson |
| 6,842,657 B1 | 1/2005 | Drzaic et al. |
| 6,864,875 B2 | 3/2005 | Drzaic et al. |
| 6,865,010 B2 | 3/2005 | Duthaler et al. |
| 6,866,760 B2 | 3/2005 | Paolini Jr. et al. |
| 6,870,657 B1 | 3/2005 | Fitzmaurice et al. |
| 6,870,661 B2 | 3/2005 | Pullen et al. |
| 6,922,276 B2 | 7/2005 | Zhang et al. |
| 6,950,220 B2 | 9/2005 | Abramson et al. |
| 6,958,848 B2 | 10/2005 | Cao et al. |
| 6,982,178 B2 | 1/2006 | LeCain et al. |
| 6,987,603 B2 | 1/2006 | Paolini, Jr. et al. |
| 6,995,550 B2 | 2/2006 | Jacobson et al. |
| 7,002,728 B2 | 2/2006 | Pullen et al. |
| 7,012,735 B2 | 3/2006 | Honeyman et al. |
| 7,030,412 B1 | 4/2006 | Drzaic et al. |
| 7,079,305 B2 * | 7/2006 | Paolini et al. ................ 359/296 |
| 7,280,094 B2 * | 10/2007 | Albert ..................... 345/107 |
| 7,411,719 B2 * | 8/2008 | Paolini et al. ................ 359/296 |
| 2002/0060321 A1 | 5/2002 | Kazlas et al. |
| 2002/0063661 A1 | 5/2002 | Comiskey et al. |
| 2002/0090980 A1 | 7/2002 | Wilcox et al. |
| 2002/0113770 A1 | 8/2002 | Jacobson et al. |
| 2002/0130832 A1 | 9/2002 | Baucom et al. |
| 2002/0180687 A1 | 12/2002 | Webber |
| 2003/0011560 A1 | 1/2003 | Albert et al. |
| 2003/0020844 A1 | 1/2003 | Albert et al. |
| 2003/0102858 A1 | 6/2003 | Jacobson et al. |
| 2003/0132908 A1 | 7/2003 | Herb et al. |
| 2003/0137521 A1 | 7/2003 | Zehner et al. |
| 2003/0151702 A1 | 8/2003 | Morrison et al. |
| 2003/0214695 A1 | 11/2003 | Abramson et al. |
| 2003/0222315 A1 | 12/2003 | Amundson et al. |
| 2004/0012839 A1 | 1/2004 | Cao et al. |
| 2004/0014265 A1 | 1/2004 | Kazlas et al. |
| 2004/0075634 A1 | 4/2004 | Gates |
| 2004/0094422 A1 | 5/2004 | Pullen et al. |
| 2004/0105036 A1 | 6/2004 | Danner et al. |
| 2004/0112750 A1 | 6/2004 | Jacobson et al. |
| 2004/0119681 A1 | 6/2004 | Albert et al. |
| 2004/0136048 A1 | 7/2004 | Arango et al. |
| 2004/0155857 A1 | 8/2004 | Duthaler et al. |
| 2004/0180476 A1 | 9/2004 | Kazlas et al. |
| 2004/0190114 A1 | 9/2004 | Jacobson et al. |
| 2004/0196215 A1 | 10/2004 | Duthaler et al. |
| 2004/0226820 A1 | 11/2004 | Webber et al. |
| 2004/0233509 A1 | 11/2004 | Zhang et al. |
| 2004/0239614 A1 | 12/2004 | Amundson et al. |
| 2004/0252360 A1 | 12/2004 | Webber et al. |
| 2004/0257635 A1 | 12/2004 | Paolini, Jr. et al. |
| 2004/0263947 A1 | 12/2004 | Drzaic et al. |
| 2005/0001810 A1 | 1/2005 | Yakushiji et al. |
| 2005/0001812 A1 | 1/2005 | Amundson et al. |
| 2005/0007336 A1 | 1/2005 | Albert et al. |
| 2005/0007653 A1 | 1/2005 | Honeyman et al. |
| 2005/0012980 A1 | 1/2005 | Wilcox et al. |
| 2005/0017944 A1 | 1/2005 | Albert |
| 2005/0018273 A1 | 1/2005 | Honeyman et al. |
| 2005/0024353 A1 | 2/2005 | Amundson et al. |
| 2005/0035941 A1 | 2/2005 | Albert et al. |
| 2005/0041004 A1 | 2/2005 | Gates et al. |
| 2005/0062714 A1 | 3/2005 | Zehner et al. |
| 2005/0067656 A1 | 3/2005 | Denis et al. |
| 2005/0078099 A1 | 4/2005 | Amundson et al. |
| 2005/0105159 A1 | 5/2005 | Paolini, Jr. et al. |
| 2005/0105162 A1 | 5/2005 | Paolini, Jr. et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0122564 A1 | 6/2005 | Zehner et al. |
| 2005/0122565 A1 | 6/2005 | Doshi et al. |
| 2005/0134554 A1 | 6/2005 | Albert et al. |
| 2005/0146774 A1 | 7/2005 | LeCain et al. |
| 2005/0151709 A1 | 7/2005 | Jacobson et al. |
| 2005/0152018 A1 | 7/2005 | Abramson et al. |
| 2005/0152022 A1 | 7/2005 | Honeyman et al. |
| 2005/0156340 A1 | 7/2005 | Valianatos et al. |
| 2005/0168799 A1 | 8/2005 | Whitesides et al. |
| 2005/0168801 A1 | 8/2005 | O'Neil et al. |
| 2005/0179642 A1 | 8/2005 | Wilcox et al. |
| 2005/0190137 A1 | 9/2005 | Duthaler et al. |
| 2005/0212747 A1 | 9/2005 | Amundson |
| 2005/0213191 A1 | 9/2005 | Whitesides et al. |
| 2005/0253777 A1 | 11/2005 | Zehner et al. |
| 2005/0270261 A1 | 12/2005 | Danner et al. |

FOREIGN PATENT DOCUMENTS

| | | |
|---|---|---|
| EP | 0 659 866 A2 | 6/1995 |
| EP | 1 099 207 B1 | 3/2002 |
| EP | 1 145 072 B1 | 5/2003 |
| EP | 1 462 847 | 9/2004 |
| EP | 1 482 354 | 12/2004 |
| EP | 1 484 635 | 12/2004 |
| EP | 1 500 971 A1 | 1/2005 |
| EP | 1 501 194 A1 | 1/2005 |
| EP | 1 536 271 | 6/2005 |
| EP | 1 542 067 | 6/2005 |
| EP | 1 577 702 | 9/2005 |
| EP | 1 577 703 | 9/2005 |
| EP | 1 598 694 | 11/2005 |
| WO | WO 00/36560 | 6/2000 |
| WO | WO 00/38000 | 6/2000 |
| WO | WO 00/67110 | 11/2000 |
| WO | WO 01/07961 | 2/2001 |
| WO | WO 2004/001498 | 12/2003 |
| WO | WO 2004/079442 | 9/2004 |
| WO | WO 2004/090626 | 10/2004 |

| | | |
|---|---|---|
| WO | WO 2005/034074 | 4/2005 |
| WO | WO 2005/052905 | 6/2005 |
| WO | WO 2005/094519 | 10/2005 |

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

Au, J. et al., "Ultra-Thin 3.1-in. Active-Matrix Electronic Ink Display for Mobile Devices", IDW'02, 223 (2002).

Bach, U., et al., "Nanomaterials-Based Electrochromics for Paper-Quality Displays", Adv. Mater, 14(11), 845 (2002).

Bampfield, H.A., and Cooper, J., "Emulsion Explosives", in "Encyclopedia of Emulsion Technology: vol. 3—Basic Theory Measurement Applications", Becher, P. (ed.), Marcel Dekker, New York (1988).

Bouchard, A. et al., "High-Resolution Microencapsulated Electrophoretic Display on Silicon", SID 04 Digest, 651 (2004).

Caillot, E. et al. "Active Matrix Electrophoretic Information Display for High Performance Mobile Devices", IDMC Proceedings (2003).

Cameron, N.R., et al., "High Internal Phase Emulsions (HIPEs)—Structure, Properties and Use in Polymer Preparation", Adv. Polym. Sci., 126, 163 (1996).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: a Printable Display Material", SID 97 Digest (1997), p. 75.

Danner, G.M. et al., "Reliability Performance for Microencapsulated Electrophoretic Displays with Simulated Active Matrix Drive", SID 03 Digest, 573 (2003).

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Gates, H. et al., "A5 Sized Electronic Paper Display for Document Viewing", SID 05 Digest, (2005).

Henzen, A. et al., "An Electronic Ink Low Latency Drawing Tablet", SID 04 Digest, 1070 (2004).

Henzen, A. et al., "Development of Active Matrix Electronic Ink Displays for Handheld Devices", SID 03 Digest, 176, (2003).

Henzen, A. et al., "Development of Active Matrix Electronic Ink Displays for Smart Handheld Applications", IDW'02, 227 (2002).

Jacobson, J., et al., "The last book", IBM Systems J., 36, 457 (1997).

Ji, Y., et al., "P-50: Polymer Walls in Higher-Polymer-Content Bistable Reflective Cholesteric Displays", SID 96 Digest, 611 (1996).

Jo, G-R, et al., "Toner Display Based on Particle Movements", Chem. Mater, 14, 664 (2002).

Johnson, M. et al., "High Quality Images on Electronic Paper Displays", SID 05 Digest, 1666 (2005).

Kazlas, P. et al., "Card-size Active-matrix Electronic Ink Display", Eurodisplay 2002, 259 (2002).

Kazlas, P., et al., "12.1 SVGA Microencapsulated Electrophoretic Active Matrix Display for Information Applicances", SID 01 Digest, 152 (Jun. 2001).

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal TiO2 Films", Nature, vol. 353, Oct. 24, 1991, 773-740.

Pitt, M.G., et al., "Power Consumption of Microencapsulated Electrophoretic Displays for Smart Handheld Applications", SID 02 Digest, 1378 (2002).

Webber, R., "Image Stability in Active-Matrix Microencapsulated Electrophoretic Displays", SID 02 Digest, 126 (2002).

Whitesides, T. et al., "Towards Video-rate Microencapsulated Dual-Particle Electrophoretic Displays", SID 04 Digest, 133 (2004).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

Zehner, R. et al., "Drive Waveforms for Active Matrix Electrophoretic Displays", SID 03 Digest, 842 (2003).

* cited by examiner

# ELECTROPHORETIC MEDIUM AND PROCESS FOR THE PRODUCTION THEREOF

REFERENCE TO RELATED APPLICATIONS

This application is a divisional of application Ser. No. 11/160,364, filed Jun. 21, 2005 now U.S. Pat. No. 7,411,719 (Publication No. 2006/0007527), which is a continuation-in-part of application Ser. No. 10/906,075, filed Feb. 2, 2005 (now U.S. Pat. No. 7,079,305), which is a divisional of application Ser. No. 09/683,903, filed Feb. 28, 2002 (now U.S. Pat. No. 6,866,760), which itself claims benefit of Provisional Applications Ser. Nos. 60/277,079 and 60/277,391, both filed Mar. 19, 2001. The aforementioned application Ser. No. 11/160,364 is also a continuation-in-part of application Ser. No. 10/329,023, filed Dec. 24, 2002 (now U.S. Pat. No. 7,109, 968), which is a continuation of application Ser. No. 09/140, 846, filed Aug. 27, 1998 (now U.S. Pat. No. 6,727,881). The aforementioned application Ser. No. 09/140,846 claims benefit of (1) Application Ser. No. 60/057,133, filed Aug. 28, 1997; (2) Application Ser. No. 60/057,716, filed Aug. 28, 1997; (3) Application Ser. No. 60/057,799, filed Aug. 28, 1997; (4) Application Ser. No. 60/057,163, filed Aug. 28, 1997; (5) Application Ser. No. 60/057,122, filed Aug. 28, 1997; (6) Application Ser. No. 60/057,798, filed Aug. 28, 1997; (7) U.S. Ser. No. 60/057,118, filed Aug. 28, 1997; (8) Application Ser. No. 60/059,543, filed Sep. 19, 1997; (9) Application Ser. No. 60/059,358, filed Sep. 19, 1997; (10) Application Ser. No. 60/065,630, filed Nov. 18, 1997; (11) Application Ser. No. 60/065,605, filed Nov. 18, 1997; (12) Application Ser. No. 60/065,629, filed Nov. 18, 1997; (13) Application Ser. No. 60/066,147, filed Nov. 19, 1997; (14) Application Ser. No. 60/066,245, filed Nov. 20, 1997; (15) Application Ser. No. 60/066,246, filed Nov. 20, 1997; (16) Application Ser. No. 60/066,115, filed Nov. 21, 1997; (17) Application Ser. No. 60/066,334, filed Nov. 21, 1997; (18) Application Ser. No. 60/066,418, filed Nov. 24, 1997; (19) Application Ser. No. 60/071,371, filed Jan. 15, 1998; (20) Application Ser. No. 60/070,940, filed Jan. 9, 1998; (21) Application Ser. No. 60/072,390, filed Jan. 9, 1998; (22) Application Ser. No. 60/070,939, filed Jan. 9, 1998; (23) Application Ser. No. 60/070,935, filed Jan. 9, 1998; (24) Application Ser. No. 60/074,454, filed Feb. 12, 1998; (25) Application Ser. No. 60/076,955, filed Mar. 5, 1998; (26) Application Ser. No. 60/076,959, filed Mar. 5, 1998; (27) Application Ser. No. 60/076,957, filed Mar. 5, 1998; (28) Application Ser. No. 60/076,956, filed Mar. 5, 1998; (29) Application Ser. No. 60/076,978, filed Mar. 5, 1998; (30) Application Ser. No. 60/078,363, filed Mar. 18, 1998; (31) Application Ser. No. 60/081,374, filed Apr. 10, 1998; (32) Application Ser. No. 60/081,362, filed Apr. 10, 1998; (33) Application Ser. No. 60/083,252, filed Apr. 27, 1998; (34) Application Ser. No. 60/085,096, filed May 12, 1998; (35) Application Ser. No. 60/090,223, filed Jun. 22, 1998; (36) Application Ser. No. 60/090,222, filed Jun. 22, 1998; (37) Application Ser. No. 60/090,232, filed Jun. 22, 1998; (38) Application Ser. No. 60/092,046, filed Jul. 8, 1998; (39) Application Ser. No. 60/092,050, filed Jul. 8, 1998; (40) Application Ser. No. 60/092,742, filed Jul. 14, 1998; and (41) Application Ser. No. 60/093,689, filed Jul. 22, 1998.

This appliction is related to U.S. Pat. No. 6,392,785, issued on a division of application Ser. No. 09/141,105, now U.S. Pat. No. 6,067,185.

The entire disclosures of all the aforementioned applications and patents, and of all U.S. patents and published and copending applications mentioned below, are herein incorporated by reference.

BACKGROUND OF INVENTION

This invention relates to a electrophoretic medium and to a process for the production of this medium. This invention also relates to an electrophoretic display incorporating such a medium. More specifically, this invention relates to a two-phase electrophoretic medium which comprises a discontinuous phase containing electrophoretically-mobile particles and a continuous phase essentially free from such particles. The present application also describes materials useful in fabricating such media and displays.

Electrophoretic displays have been the subject of intense research and development for a number of years. Such displays can have attributes of good brightness and contrast, wide viewing angles, state bistability, and low power consumption when compared with liquid crystal displays. (The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element.) Nevertheless, problems with the long-term image quality of these displays have prevented their widespread usage. For example, particles that make up electrophoretic displays tend to cluster and settle, resulting in inadequate service-life for these displays.

Numerous patents and applications assigned to or in the names of the Massachusetts Institute of Technology and E Ink Corporation have recently been published described encapsulated electrophoretic media. Such encapsulated media comprise numerous small capsules, each of which itself comprises an internal phase containing electrophoretically-mobile particles suspended in a liquid suspension medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,241,921; 6,249,271; 6,252,564; 6,262,706; 6,262,833; 6,300,932; 6,312,304; 6,312,971; 6,323,989; and 6,327,072; U.S. Patent Application Publication No. 2001-0045934; and International Applications Publication Nos. WO 97/04398; WO 98/03896; WO 98/19208; WO 98/41898; WO 98/41899; WO 99/10767; WO 99/10768; WO 99/10769; WO 99/47970; WO 99/53371; WO 99/53373; WO 99/56171; WO 99/59101; WO 99/67678; WO 00/03349; WO 00/03291; WO 00/05704; WO 00/20921; WO 00/20922; WO 00/20923; WO 00/26761; WO 00/36465; WO 00/36560; WO 00/36666; WO 00/38000; WO 00/38001; WO 00/59625; WO 00/60410; WO 00/67110; WO 00/67327 WO 01/02899; WO 01/07691; WO 01/08241; WO 01/08242; WO 01/17029; WO 01/17040; WO 01/17041; WO 01/80287 and WO 02/07216.

Encapsulated electrophoretic displays solve, or at least reduce, many of the problems previously associated with electrophoretic displays, and offer additional advantages compared to liquid crystal displays. Some added advantages are the ability to print or coat the display material on a wide variety of flexible and rigid substrates. The clustering and settling problems, which plagued prior art electrophoretic displays and resulted in inadequate lifetimes for the displays are now overcome.

This application describes electrophoretic displays, especially encapsulated electrophoretic displays, and classes of materials, as well as some specific materials, which should be useful in their construction.

The successful construction of an encapsulated electrophoretic display requires the proper interaction of several different types of materials and processes. Materials such as a polymeric binder, a capsule membrane, and the electrophoretic particles and fluid must all be chemically compatible. The capsule membranes may engage in useful surface interactions with the electrophoretic particles, or may act as an inert physical boundary between the fluid and the binder. Polymer binders may act as adhesives between capsule membranes and electrode surfaces.

It has now been recognized that a separate encapsulation step of the process is not always necessary. The electrophoretic fluid may be directly dispersed or emulsified into the binder (or a precursor to the binder material—this binder or precursor may for convenience be referred to as the "continuous phase") to form what may be called a "polymer-dispersed electrophoretic display". In such displays, the individual electrophoretic phases ("droplets") may be referred to as capsules or microcapsules even though no capsule membrane is present, i.e., there is no discrete capsule membrane associated with each individual droplet. Such polymer-dispersed electrophoretic displays, which are the subject of the present invention, are considered to be subsets of encapsulated electrophoretic displays.

It has now been found that two-phase electrophoretic media with advantageous properties can be prepared using a simple, inexpensive process, and this invention relates to such media and to processes for their preparation.

SUMMARY OF INVENTION

Accordingly, this invention provides a two-phase electrophoretic medium comprising a continuous phase and a discontinuous phase, the discontinuous phase comprising a plurality of droplets, each of which comprises a suspending fluid and at least one particle disposed within the suspending fluid and capable of moving through the fluid upon application of an electric field to the electrophoretic medium, and the continuous phase surrounding and encapsulating the discontinuous phase.

This invention also provides a process for producing a two-phase electrophoretic medium, this process comprising:
  providing a liquid medium comprising a film-forming material;
  dispersing in the liquid medium a plurality of droplets, each of which comprises a
  suspending fluid and at least one particle disposed within the suspending fluid and capable of moving through the fluid upon application of an electric field thereto; and
  subjecting the liquid medium to conditions effective to cause the film-forming therein to form a film, and thereby producing a two-phase electrophoretic medium in which the film-forming material forms a continuous phase surrounding and encapsulating the droplets, which form the discontinuous phase of the electrophoretic medium.

BRIEF DESCRIPTION OF DRAWINGS

Preferred embodiments of the invention will now be described, though by way of illustration only, with reference to the accompanying drawings, in which.

Like reference characters in the drawings represent corresponding parts.

DETAILED DESCRIPTION

Figure 1:
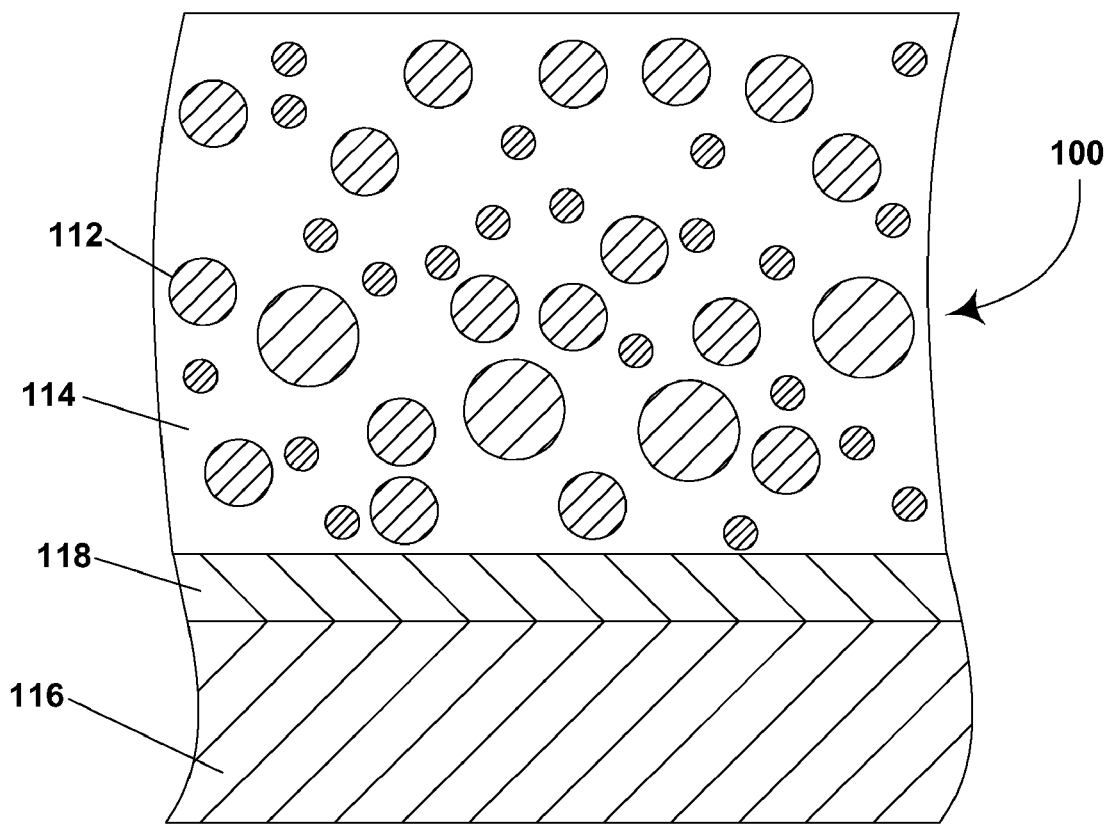
FIG. 1 is a schematic cross-section illustrating an intermediate stage in a process of the present invention after coating a mixture of a liquid medium and electrophoretic droplets on to a substrate but before drying of the mixture.

As already mentioned, the present invention provides a two-phase electrophoretic medium comprising a continuous phase and a discontinuous phase. The discontinuous phase comprises a plurality of droplets, each droplet itself comprising a suspending fluid and at least one particle disposed within the suspending fluid and capable of moving through the fluid upon application of an electric field to the electrophoretic medium. This discontinuous phase desirably comprises at least about 40 percent by volume of the electrophoretic medium. The continuous phase surrounds and encapsulates the discontinuous phase, thus providing a cohesive electrophoretic medium.

In the present electrophoretic medium, the discontinuous phase (droplets) may comprise from about 40 to about 95 percent by volume of the medium, but preferably comprises about 50 to about 80 percent by volume. The optimum proportion of droplets will of course vary with the specific materials employed, but will typically be in the range of about 60 to about 70 percent by volume. If the proportion of droplets is too high, the electrophoretic medium is mechanically weak and easily damaged, and droplets may leak from the medium upon rough handling. On the other hand, it is undesirable to use a proportion of continuous phase substantially larger than that required to provide mechanical strength to the medium. As is well-known to those knowledgeable concerning electrophoretic displays, such displays normally comprise a thin layer of the electrophoretic medium between two electrodes, so that at any given operating voltage between the electrodes, the field applied to the electrophoretic medium is inversely proportional to its thickness. If excess continuous phase is used in the present medium, the thickness of the medium needed to provide a given amount of droplets will be unnecessarily increased, so that either the applied field will be reduced (and the switching time of the display thereby increased) or the operating voltage must be increased, either of which is undesirable.

The droplets used in the present medium may be of any of the types described in the aforementioned patents and applications, as discussed in more detail below. Specifically, the droplets may comprise a single type of particle disposed in a colored suspending fluid, or two or more types of particles, differing in charge polarity and/or electrophoretic mobility; in the latter case, the suspending fluid may be colored or uncolored. However, the use of droplets containing two or more types of particles and an uncolored suspending fluid is generally preferred, since the present invention is well adapted to form electrophoretic media in layers less than 50 µm in thickness (as discussed in more detail below) with droplets less than 20 µm in thickness, and in such thin layers and droplets, there may be difficulty in providing colored suspending fluids having sufficient optical density to completely hide the electrophoretic particles when the particles are drawn away from the viewing surface of the display so that the color of the suspending medium is intended to be visible. As discussed in more detail below, the suspension medium is normally an organic liquid, typically a mixture of a hydrocarbon and a halocarbon, so water-dispersible materials are preferred for the continuous phase of the present electrophoretic medium.

As already indicated, the electrophoretic medium of the present invention is prepared by dispersing the droplets in a liquid medium containing a film-forming material, and then subjecting the liquid medium to conditions effective to cause the film-forming material to form a film and thus produce the two-phase electrophoretic medium in which the film-forming material forms the continuous phase and the droplets form the discontinuous phase. The initial dispersion or emulsification of the droplets in the liquid medium may be effected by any of a variety of conventional techniques, for example rapid stirring of a mixture of the liquid medium and the material which will form the droplets, or sonication of such a mixture. Devices suitable for forming the droplets also include, but are not limited to, blade mixers, rotor-stator mixers and colloid mills, devices in which a liquid stream is pumped at high pressures through an orifice or interation chamber (such as the Microfluidizer sold by Microfluidics), sonicators, Gaulin mills, homogenizers, blenders, etc. The dispersion or emulsification may also be effected by shearing, using a colloid mill or similar apparatus. It should, however, be noted that the presence of the electrophoretic particles within the droplets tends to make a dispersion or emulsion of such droplets less stable than a similar emulsion or dispersion of the same materials in which the droplets do not contains solid particles, and hence in the present process it is preferred to use a liquid medium which can solidify rapidly.

Good results have been achieved by using a gelatin solution as the liquid medium and spreading a thin layer of at least about 50 µm, but preferably from about 50 µm to about 200 µm, on to a cool substrate so that the gelatin solidifies very rapidly. Typically the layer is spread to a thickness of about 100 µm. As already indicated, the film-forming material used in the present invention is preferably gelatin, such as lime-processed gelatin, acid-processed pig gelatin or acid-processed ossein gelatin, or a modified gelatin such as acetylated gelatin, phthalated gelatin, oxidized gelatin, etc. Other film formers include water-soluble polymers and co-polymers including, but not limited to, poly(vinyl alcohol), partially hydrolyzed poly(vinyl acetate/vinyl alcohol), hydroxyethyl cellulose, poly(vinylpyrrolidone), and polyacrylamide. Copolymers of these with hydrophobic monomers, such as t-butyl acrylamide, or isopropyl acrylamide can also be used. Polymeric film formers that are also capable of gelation upon application of high or low temperature are particularly useful. Such materials include the various gelatins described above, cellulosic materials, and homopolymers or copolymers containing isopropyl acrylamide.

Radiation-curable (typically ultra-violet light-curable) materials may also be used as film formers, which could be an aqueous dispersion of a curable polymer, a polymer melt, a monomer, an oligomer or various mixtures of these forms. The curable material could be a separate continuous phase analogous to the gelatin continuous phase already described. However, the curable material could also be dissolved in the "discontinuous" phase so that upon exposure to the curing radiation, the curable material both cures and separates from the phase in which it is originally dissolved to form a separate continuous phase. Such a system would have the advantage that, prior to the radiation exposure, the liquid medium would constitute only a single phase (except of course for the electrophoretic particles dispersed therein) and coating such a single phase system is often simpler and easier to control than coating of a two-phase system.

The film-forming material may alternatively be a two-component system; for example, one component could be a polymerizable material and the other a polymerization initiator (the use of liquid media containing glycol-type solvents might be useful in such systems), or the two components could be reagents known to be stable in isolation but to form a polymer on contact with one another, for example a polyurethane pre-polymer and water or another active-hydrogen containing material. A two-component film-forming material may be useful, for instance, where it is desired to spray the liquid medium on to a substrate, rather than coat the substrate. As is well-known in the coating industry, a mixture containing a two-component film-forming material can conveniently be sprayed by pumping a liquid medium containing one component through a nozzle provided with an injection port through which the other component is added to the liquid medium, so that the two-component mixture is formed within the nozzle and immediately sprayed.

Alternatively, two-component film-forming materials are available which either have a substantial "lag" time between the time when the components are mixed and the polymerization or other film-forming process occurs, or which require some external stimulus, such as heat or contact with atmospheric moisture, to initiate the film-forming process. Any of these systems permit mixing of all the components of the eventual electrophoretic medium before the liquid medium is deposited upon the substrate.

A two-component film-forming material may also be useful for coating irregularly-shaped substrates and/or coating only certain parts of substrates. In both cases, the first of the two components may be placed on the substrate, or on those parts of the substrate which it is desired to coat with the final electrophoretic medium (for example, an irregularly-shaped substrate could be coated by dip coating), and then the liquid phase containing the second component of the film-forming material could be applied to the substrate so that the electrophoretic medium is formed only on those parts of the substrate previously coated with the first component.

In a further variant of a two-component film-forming material, one of the two components is dispersed in the continuous phase of the liquid medium, while the second component is dispersed in the droplets, so that film formation occurs first at the phase boundary between the droplets and the continuous phase, thus producing weak walls around the droplets and thus reducing any tendency for the droplets to rupture or otherwise become damaged during later handling or shrinkage of the electrophoretic medium.

Both radiation-curable and two-component film-forming materials could also be used in other techniques for patterning the final electrophoretic medium on to a substrate. A continuous layer of a radiation-curable liquid medium could be applied to the substrate and thereafter radiation could be imagewise applied to the continuous layer so that the cured electrophoretic medium is only formed where the continuous layer is exposed to the radiation; the radiation-curable liquid medium would thus act like a positive photoresist. Similarly, a continuous layer of a liquid medium containing only one component of a two-component film-forming material could be applied to a substrate and the second component applied in an imagewise manner so that the cured electrophoretic medium is only formed where the second component is applied. In either case, the uncured liquid medium could then be washed off leaving a patterned electrophoretic medium on the substrate.

Such patterning techniques may be used to form color electrophoretic displays. It has previously been suggested that full color electrophoretic displays could be formed in a manner analogous to the phosphors on color cathode ray tubes by patterning three different types of microencapsulated electrophoretic media capable of displaying different color in separate but closely-spaced areas of the display. Such a structure could be produced by repeating the procedure described in the preceding paragraph three times with different discontinuous phases in the electrophoretic media, the uncured liquid medium being removed after each radiation exposure or application of the second component.

(The radiation-curing technique described above is analogous to a conventional positive photoresist. A process of the present invention analogous to a negative photoresist is also possible. Such a process would form an electrophoretic medium having a continuous phase which would depolymerize or otherwise degrade upon exposure to radiation. The electrophoretic medium would be formed by any of the techniques described above, imagewise exposed to radiation to degrade the areas where no electrophoretic medium was desired in the final product, and washed with an appropriate solvent (which need not be aqueous) to remove the degraded electrophoretic medium. This process would, however, be complicated to use than the "positive photoresist" variant described above.)

The radiation-curing and two-component film-forming material techniques described above could be used in combination with other techniques to form the electrophoretic media of the present invention. For example, radiation-curing or two-component film-forming material could be used to produce an initial stable film from a liquid phase and thereafter this stable film could be dried or otherwise treated to cause it to shrink and form the final electrophoretic medium. Alternatively, either radiation exposure, or deposition of the second component of a two-component film-forming material on to the surface, of a film of liquid medium on a substrate may be useful in forming a "skin" on the exposed surface of the layer of liquid medium; such a skin may, in some systems, be useful in reducing any tendency for droplets of the discontinuous phase to rupture at this exposed surface.

The present invention also allows for formation of patterned electrophoretic medium by a technique analogous to lithographic printing. A substrate may be patterned in a manner which allows the liquid medium used in the present process to deposit upon some areas of the substrate but not others. For example, a hydrophilic substrate could be printed with a conventional water-repellant lithographic ink, thus rendering the ink-covered areas hydrophobic, and the printed substrate treated with a liquid medium, similar to those used in the Examples above, having a hydrophilic gelatin-based continuous phase, so that the liquid medium only deposits on the unprinted areas of the substrate. After drying and formation of the electrophoretic medium, the ink could if desired be removed using a non-aqueous solvent. Alternatively and perhaps more conveniently, the ink could be replaced by a similar liquid comprising only the hydrophobic vehicle of a conventional lithographic ink, without the pigment, thus avoiding any need to remove the colored ink after formation of the final electrophoretic medium.

The present invention provides considerable flexibility in the physical form of the final electrophoretic medium. For example, by using either a hot melt polymer (such as ethylene/vinyl acetate) or a reactive injection molding urethane polymer, the present process can make use of conventional injection molding techniques to form sheets of electrophoretic medium of any desired shape with a mold.

It must be emphasized that the present invention is not restricted to any particular technique for formation of the droplets in the liquid medium, or to any particular type of physico-chemical change for film formation. For example, in addition to the techniques previously described, the liquid medium could be formed by coextrusion of its two phases through a nozzle, as known in the art for forming other types of emulsions. Alternatively, the droplets of the discontinuous phase could be formed by emulsification in one medium, and the droplets separated from the bulk of the phase of this medium and redispersed in a different medium to form the liquid phase used in the present process. The liquid medium may also be formed by high internal phase emulsion techniques, as described for example in Cameron, N. R., and Sherrington, D. C., "High Internal Phase Emulsions (HIPEs)—Structure, Properties and Use in Polymer Preparation", Adv. Polym. Sci., 126, 163 (1996); and Bampfield, H. A., and Cooper, J., "Emulsion Explosives", in "Encyclopedia of Emulsion Technology: Volume 3—Basic Theory Measurement Applications, Becher, P. (ed.), Marcel Dekker, New York (1988). The limited coalescence process may be used to create essentially monodisperse droplets with adjustable diameters from about 1 μm to over 100 μm. This process is described in U.S. Pat. Nos. 4,994,312; 5,055,371; 2,932,629; 2,934,530; 4,833,060; 4835,084; 4,965,131; 5,354,799; 5,580,692; 5,700,608, 6,156,473; and 6,113,810. The droplets may also be formed by shearing the liquid used to form the droplets, or by couette flow (passage of a liquid through a narrow gap between two relatively moving surfaces, for example between two co-axial cylinders one of which is fixed and the other moving).

In the present process, film formation may take place by a sol/gel transformation, using for example a water glass based continuous phase.

As will be apparent from the foregoing discussion, a wide variety of materials may be used in the present process. Aqueous external phases in this process may include dispersion polymers, such as latices, urethane dispersions, silicones and epoxies, and solution polymers such as poly(vinyl alcohol) and poly(vinylpyrrolidone). Film-forming materials which may be useful include lower consolute temperature polymers such as N-isopropylacrylamide, and highly shear thinning, high low-shear viscosity polymers such as gums, xanthan, carageenan, associative thickeners, and cellulosic gelling agents, which may also form the continuous phase matrix. Silicone polymers may be used in the continuous phase where stability of the medium is of major concern. Also, the continuous phase may comprise a pressure-sensitive adhesive to improve adhesion of the electrophoretic medium to the substrate. A wide variety of solvents, for example fluorosilicones, may be used as the liquid vehicles in the discontinuous phase.

The present invention may be varied by first forming a layer comprising the continuous phase of an electrophoretic medium and then injected droplets of electrophoretic fluid into this layer, for example by ink jet printing or similar techniques. Where the continuous phase is of a type which is to be shrunk to produce the final electrophoretic medium, it is generally desirable to inject the droplets of electrophoretic fluid before shrinking the medium to provide, in the final medium, non-spherical droplets, for the reasons already discussed.

In order to assist in stabilizing the droplets, it is advantageous to add a surfactant to the dispersion or emulsion, a preferred surfactant for this purpose being sodium dodecylsulfate, typically added in an amount of about 0.1 to about 1 percent by weight of the liquid medium. Other surfactants which may be useful include Alkanol XC (an alkyl sulfonate surfactant available from E. I. du Pont de Nemours and Company, Wilmington, Del.), sodium dodecylbenzene sulfonate, and bis(2-ethylhexyl)sulfosuccinate (available as Aerosol OT from Cytec Industries, Inc., West Paterson N.J. 07424). Nonionic surfactants and zwitterionic surfactants, for example betaines and lecithin-type molecules, may also be useful. Since dispersions of electrophoretic particles used to form the droplet in the present medium often contain substantial amounts of surfactants, some of which will inevitably diffuse to the droplet/continuous phase boundary, it may be necessary to adjust the amount of surfactant added the dispersion or emulsion to allow for the effects of the surfactant already present in the droplets.

Although the discontinuous phase of the present medium is referred to herein as "droplets", such references are not to be construed as limiting the discontinuous phase to spherical or near-spherical droplets. Indeed, it is preferred that the droplets not be spherical. As discussed in the aforementioned U.S. Pat. No. 6,067,185, there are significant advantages to using non-spherical droplets in electrophoretic media, and this patent discusses various ways in which spherical microcapsules may deliberately be distorted into non-spherical shapes during incorporation of such microcapsules into a binder. The present invention has the advantage that, by careful choice of materials and processing conditions, the electrophoretic medium can be formed with its discontinuous phase in the form of non-spherical droplets.

Figure 2:
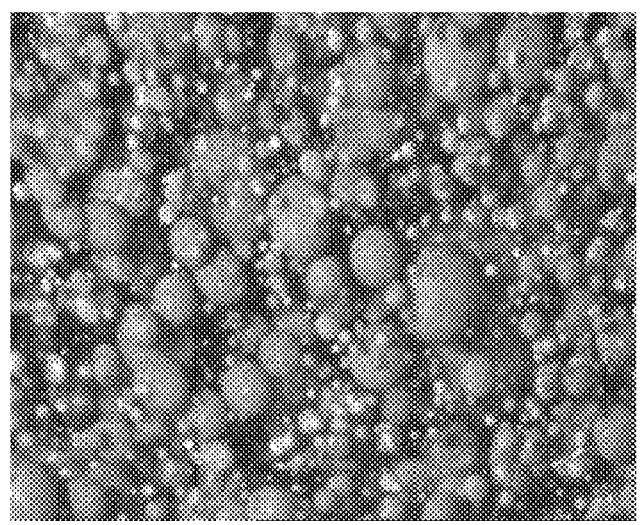
FIG. 2 is a photomicrograph showing a top plan view of the intermediate stage shown in FIG. 1.
Figure 3:
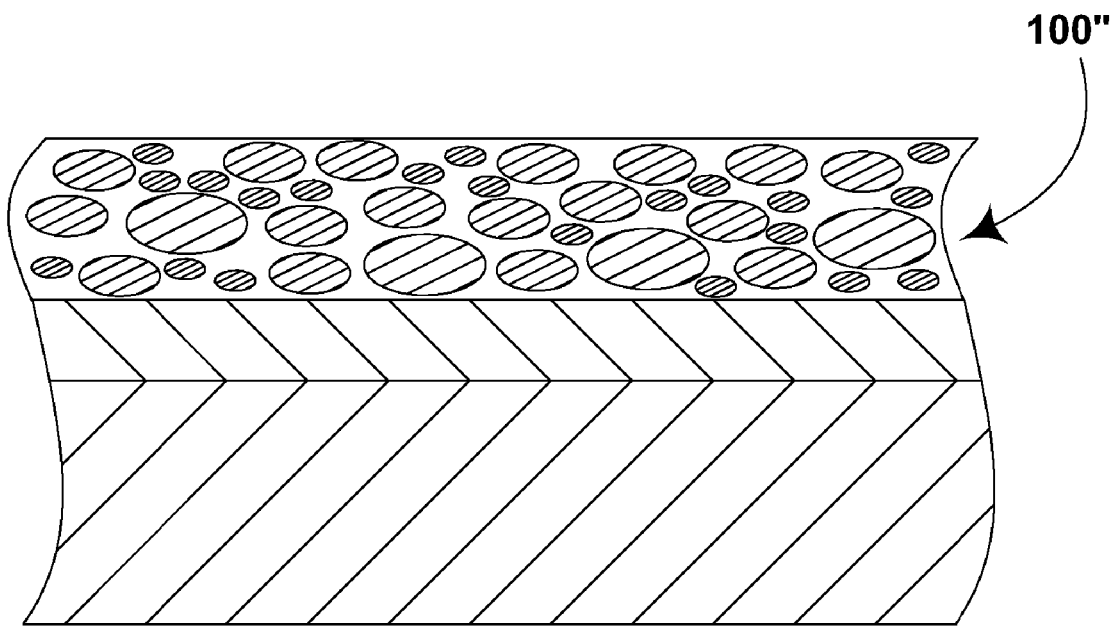
FIG. 3 is a schematic cross-section similar to that FIG. 1, but showing the final medium of the present invention after drying.
Figure 4:
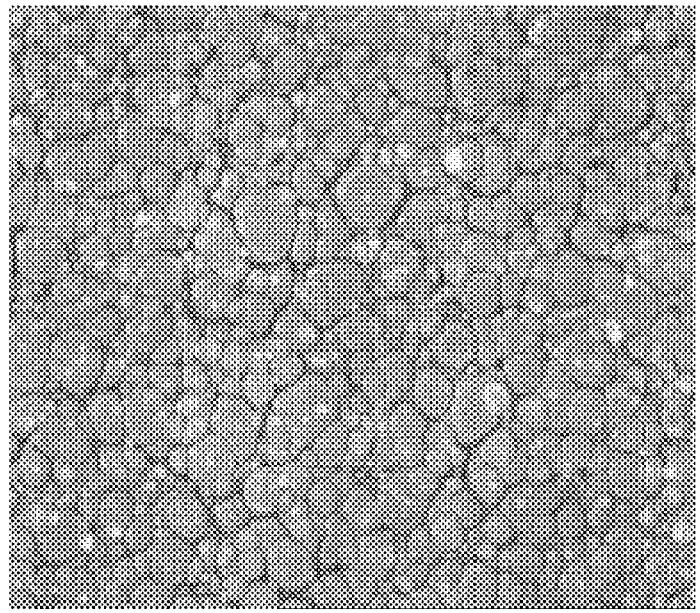
FIG. 4 is a photomicrograph similar to that FIG. 2 but showing a top plan view of the final medium shown in FIG. 3.

Media of the present invention containing non-spherical droplets can readily be prepared by using a film-forming material which produces a film which can be shrunk substantially after its formation. One useful discontinuous phase for this purpose is gelatin, although other proteinaceous materials, and possibly cross-linkable polymers, may alternatively be employed. A mixture of the liquid material (which will eventually form the continuous phase) and the droplets is formed and coated on to a substrate to form a structure as illustrated in FIGS. 1 and 2. FIG. 1 shows a layer 100 comprising droplets 112 dispersed in a liquid medium 114 which is in the process of forming a film, this layer 100 having been coated on a substrate 116 (preferably a flexible polymeric film, such as a polyester film) previously provided with a layer 118 of a transparent electrically conductive material, such as indium-tin oxide. The liquid material forms a relatively thick layer 100 containing essentially spherical droplets 112; as shown in FIG. 1. After the layer 100 has formed a solid continuous phase, the layer is then allowed to dry, preferably at about room temperature (although the layer may be heated if desired) for a period sufficient to dehydrate the gelatin, thus causing substantial reduction in the thickness of the layer and producing the type of structure illustrated in FIGS. 3 and 4, the dried and shrunken layer being designated 100" in FIG. 3. The "vertical" shrinkage of the layer (i.e., the shrinkage perpendicular to the surface of the substrate 116) in effect compresses the original spherical droplets into oblate ellipsoids whose thickness perpendicular to the surface is substantially smaller than their lateral dimensions parallel to the surface. In practice, as illustrated in FIG. 4, the droplets are normally sufficiently closely packed that the lateral edges of adjacent droplets contact each other, so that the final forms of the droplets more closely resemble irregular prisms than oblate ellipsoids. Also as shown in FIG. 3, more than one layer of droplets may be present in the final medium. When the medium is of the type shown in FIGS. 3 and 4 in which the droplets are polydisperse (i.e., a wide range of droplet sizes are present), the presence of such multiple layers is advantageous in that it reduces the chance that small areas of the substrate will not be covered by any droplet; hence, the multiple layers help to ensure that the electrophoretic medium is completely opaque and that no part of the substrate is visible in a display formed from the medium. However, in a medium using essentially monodisperse droplets (i.e., droplets all of substantially the same size), it will generally be advisable to coat the medium in a layer which, after shrinkage, will produce a close-packed monolayer of droplets, cf. U.S. Pat. No. 6,839,158. Because they lack the relatively rigid microcapsule walls found in microencapsulated electrophoretic media, the droplets used in the present invention may tend to pack more tightly into a close-packed monolayer than do microcapsules.

Contrary to what might be expected, experimentally it has been found that, at least in the preferred embodiments of the invention described in the Examples below, the droplets do not coalesce during the drying of the medium. However, we do not exclude the possibility that, in certain embodiments of the invention some rupturing of the walls between adjacent capsules might occur, thus providing a partial connection between droplets.

The degree of deformation of the droplets which occurs during the drying step, and hence the final forms of the droplets, may be varied by controlling the proportion of water in the gelatin solution and the ratio of this solution to the droplets. For example, experiments were conducted using gelatin solutions of from 2 to 15 percent by weight, and using 200 grams of each gelatin solution and 50 grams of the "internal" non-aqueous phase which forms the droplets. To produce a final layer of electrophoretic medium 30 μm in thickness, it was necessary to coat a layer of the 2 percent gelatin solution/internal phase mixture 139 μm in thickness; upon drying, this layer produced an electrophoretic medium 30 μm in thickness containing 92.6 percent by volume of droplets. On the other hand, to produce the same final thickness of electrophoretic medium, the 15 percent gelatin solution/internal phase mixture was coated at a thickness of 93 μm, and upon drying produced an electrophoretic medium containing 62.5 percent by volume of droplets. The medium produced from the 2 percent gelatin solution was weaker than is desirable to withstand robust handling; media produced from gelatin solutions containing from 5 to 15 percent by weight of gelatin had satisfactory mechanical properties.

The degree of deformation of the droplets in the final electrophoretic medium is also affected by the initial size of the droplets, and the relationship between this initial size and the thickness of the final layer of electrophoretic medium. Experiments indicate that the larger the average initial size of the droplets and/or the larger the ratio of this average initial size to the thickness of the final layer, the greater is the deformation of the droplets from a spherical shape in the final layer. In general, it is preferred that the average initial size of the droplets be from about 25 percent to about 400 percent of the thickness of the final layer. For example, in the experiments previously described, in which the thickness of the final layer was 30 μm, good results were obtained with an initial average droplet size of 10 to 100 μm.

Gelatin forms a film by a sol/gel transformation, but the present invention is not restricted to film-forming materials which form their films by such sol/gel transformation. For example, the formation of the film may be accomplished by the polymerization of a monomer or oligomer, by the cross-linking of a polymer or oligomer, or by any other known film-forming process. Similarly, in the preferred variant of the invention in which the film is first formed and then caused to shrink in thickness, this shrinkage need not accomplished by the same type of dehydration mechanism by which a gelatin film shrinks, but may be accomplished by removal of a solvent, aqueous or non-aqueous, from the film, cross-linking of a polymeric film or any other conventional procedure.

It has been found that the choice of continuous phase material in the electrophoretic media of the present invention can have significant effects upon the electro-optic properties of the medium, and especially the manner in which these electro-optic properties change when the medium is exposed to atmospheres having high relative humidity.

As discussed in several E Ink and MIT patents and applications, it is known that encapsulated electrophoretic media are sensitive to moisture, and hence to atmospheric humidity; see, for example, U.S. Patent Publication No. 2004/0027327, which contains an extensive discussion of methods of sealing electrophoretic displays against ingress of atmospheric moisture. At high relative humidities, the contrast between the two extreme optical states of encapsulated electrophoretic displays gradually decreases, eventually resulting in unsatisfactory images. In general, the polymer-dispersed displays of the present invention tend to have somewhat better resistance to high relative humidity than encapsulated displays formed from similar materials, but the resistance to high humidity of gelatin-based polymer-dispersed electrophoretic displays is still less than is desirable.

It has also been found that the dynamic range (the difference between the two extreme optical states) of polymer-dispersed media tends to be somewhat less than that of similar encapsulated media. Typically, polymer-dispersed media have dynamic ranges of about 30 L* units (where L* has the usual CIE definition) whereas encapsulated media have dynamic ranges of about 40 L* units. At least part of the difference in dynamic ranges appears to be due to greater self-erasing in the polymer-dispersed media. (Self-erasing is a phenomenon whereby, when an electro-optic medium has been driven from one extreme optical state to the other, and the driving voltage is removed, the medium spontaneously moves part way back to its original optical state. For example, when an electro-optic medium is driven from black to white, and the driving voltage is removed, self-erasing may cause the medium to spontaneously change from white to a light gray.) It has been found that the dynamic range of polymer-dispersed media can be improved, and self-erasing reduced, by careful choice of the continuous phase material in such media.

One route to reducing the humidity sensitivity of polymer-dispersed electrophoretic media is replacing part or all of the gelatin with a synthetic polymer; in practice, it has been found desirable to keep a minor proportion of gelatin in the continuous phase to stabilize the droplets, although other materials may be used for the same purpose. It has been found that the humidity sensitivity of such gelatin/synthetic polymer media varies with the number of ions present in the synthetic polymer. For example, it has been found that polymer-dispersed media having good mechanical properties can be produced using as the continuous phase a 19% aqueous solution of poly(vinylpyrrolidone-co-dimethylaminoethyl methacrylate—hereinafter abbreviated "PVD"), of the formula:

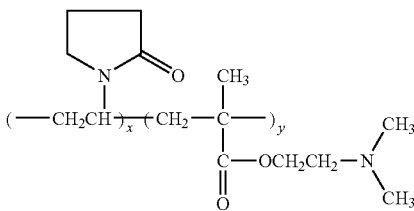

together with a minor proportion of gelatin. However, under neutral or acidic conditions, PVD becomes partially quaternized, and thus ionic. The resultant high concentration of ions in PVD results in high sensitivity to relative humidity.

It has been found that the sensitivity to relative humidity of displays of the present invention can be substantially reduced by replacing PVD with non-ionizable polymers, i.e., water-soluble polymers which do not generate any ions by dissociation at any pH to which the electrophoretic medium will be subjected when the display is in use (typically around pH 7). Useful non-ionizable polymers for thus purpose include poly(vinylpyrrolidone) (PVP), polyacrylamide (PAM), poly(N-iso-propylacrylamide), poly(methacrylamide), poly(ethylene glycol), poly(ethylene oxide), poly(vinylpyrrolidone-co-vinyl acetate) and poly(vinyl alcohol).

Another approach to reducing the humidity sensitivity of polymer-dispersed electrophoretic media is to use as the continuous phase a water-soluble polymer that is crystalline at ambient temperatures (say 20° C.). It is believed (although the invention is in no way limited by this belief) that a crystalline continuous phase serves as a moisture barrier to prevent, or at least retard, ingress of water molecules into the electrophoretic medium, thus reducing the humidity sensitivity of the display. Useful crystalline polymers for this purpose include poly(ethylene glycol), poly(ethylene oxide) (PEO), poly(vinyl alcohol) (PVOH), poly(vinyl alcohol-co-vinyl acetate), and poly(vinylpyridine). Mixtures of two or more of the aforementioned polymers may of course be used, as may mixtures of crystalline and non-ionizable polymers.

From the foregoing, it will be seen that the present invention can be used to form the electrophoretic medium in the form of layers less than 50 µm in thickness. Indeed, the present invention can be used to prepare electrophoretic media in layers as thin as 20 µm, and possibly even thinner. Such thin layers have the advantage that they reduce the operating voltage and/or switching time of an electrophoretic display. Obviously, for any layer of a specific electrophoretic medium, the operating voltage required is proportional to the thickness of the medium. Also, at any given field strength the switching time of the medium is directly proportional to the distance which the electrophoretic particles must move to effect switching, and this distance is substantially equal to the thickness of a droplet perpendicular to the substrate. Accordingly, at a given operating voltage, the switching time of a layer of electrophoretic medium is proportional to the square of the thickness of the layer. Accordingly, the very thin layers of electrophoretic medium which can be achieved using the present invention allow for lowered operating voltages and/or switching times.

The process of the present invention also offers the advantage of reduced processing time as compared with processes for the production of microencapsulated electrophoretic media. The preferred emulsification/coating/drying procedure of the present invention described above using gelatin can be completed in about 1 to 2 hours; in contrast, the microencapsulation process described in Example 1 of WO 99/10767 involves a processing time of at least two working days, with at least one overnight step. The process and electrophoretic media of the present invention also tend to display improved performance at low temperatures and greater mechanical durability than similar encapsulated media.

The following Examples are now given, though by way of illustration only, to show details of particularly preferred reagents, conditions and techniques used in the present electrophoretic medium and process for its preparation.

EXAMPLE 1

An internal dual-particle phase (i.e., a phase which will eventually form droplets) was prepared containing 30 percent by weight of polymer-coated white particles (titania) and 5 percent by weight polymer-coated black particles (carbon black) in a suspension medium comprising a mixture of a hydrocarbon (Isopar-G, available commercially from Exxon Corporation, Houston, Tex.; "Isopar" is a Registered Trade Mark) and a halogenated hydrocarbon oil (Halogenated hydrocarbon oil 0.8, available commercially from Halogenated Hydrocarbon Products Corporation, River Edge, N.J.) and containing a dispersant (Solsperse 17000, available commercially from Avecia Ltd., Blackley, Manchester, United Kingdom; "Solsperse" is a Registered Trade Mark). Separately, a 15 percent w/w solution of pigskin gelatin (300 Bloom strength gelatin from Dynagel Inc., Calumet City, Ill. 60409) was prepared. The gelatin solution (200 g) was placed in a reactor equipped with a stirrer, SDS (0.3 g) was added, and the resultant mixture was stirred gently (at 100 rpm) and brought to 45° C. The internal phase (66.3 g) previously warmed to 45° C. was added over a period of about 10 seconds through a tube opening below the surface of the gelatin solution under intense stirring (250 rpm), and this stirring was continued for 30 minutes.

A 10 ml aliquot of the resultant emulsion was transferred by means of a pipette to an ITO-coated polyester film and spread over the film by a draw down bar provided with a 2.5 mil (63 µm) gap. The thin layer thus produced solidified almost immediately, and the coated polyester film was then allowed to dry in air at ambient temperature for 15 minutes. The thickness of the final layer of electrophoretic medium thus produced was approximately 20 µm, and microscopy indicated that the maximum droplet size in the medium was about 10 µm.

In order to test the switching properties of the medium, a conductive adhesive tape, comprising a pressure-sensitive adhesive loaded with carbon black, was applied to the exposed surface of the medium, and then an ITO-coated polyester film was applied to the adhesive tape. A 15 V square wave form (500 msec at 15 V followed by 500 msec at 0 V) was applied to the ITO electrodes. The electrophoretic medium switched in both directions in less than 100 msec, and displayed a white state reflectance of 22.4 percent and a dark state reflectance of 3.0 percent.

EXAMPLE 2

Example 1 was repeated except that the internal phase contained 17 percent by weight white particles and 1.8 percent by weight black particles, and that only 59.5 g of internal phase was added to 200 g of gelatin solution in order to keep the volume ratio of the two phases the same as in Example 1. Also, a 5 mil (127 µm) gap was used with the draw down bar to produce a dried electrophoretic medium approximately 41 µm thick and having a maximum droplet size of about 35 µm.

In order to test the switching properties of the medium, the medium was vacuum laminated at 60° C. to a ITO-coated polyester using NeoRez R-9320 urethane binder (available commercially from Zeneca Resins, Wilmington, Del.; NeoRez is a Registered Trade Mark) as the lamination adhesive; the lamination adhesive layer in the final structure was 79 μm thick. A 30 V square wave form (500 msec at 30 V followed by 500 msec at 0 V) was applied to the electrodes. The electrophoretic medium switched in both directions in less than 70 msec, and displayed a white state reflectance of 27.3 percent and a dark state reflectance of 6.6 percent.

EXAMPLE 3

PVD Medium

An internal phase (electrophoretic particles plus suspending fluid and additives) was formulated using a polymer-coated copper chromite black pigment prepared substantially as described in Example 3 of U.S. Patent Application Publication No. 2005/0000813 and a polymer-coated titania white pigment prepared substantially as described in Example 28 of U.S. Pat. No. 6,822,782. The internal phase was prepared by mixing the following components was prepared by combining the following constituents:

| | |
|---|---|
| Copper chromite (60 weight percent dispersion in Isopar G) | 321.90 g |
| Titania (60 weight percent dispersion in Isopar G): | 804.76 g |
| Solsperse 17K (10 weight percent solution in Isopar G) | 94.64 g |
| Span 85 | 3.38 g |
| Additional Isopar G: | 75.31 g |

The resultant mixture was sonicated for 1 hour by immersion in a sonicating water bath, and then rolled overnight on a mechanical roller to produce an internal phase ready for conversion to a polymer-dispersed electrophoretic medium.

To convert this internal phase to a polymer-dispersed electrophoretic medium, gelatin (5.7 g) was dissolved in de-ionized water (230 mL) held at 50° C. in a 500 mL water-jacketed reactor equipped with a mechanical overhead stirrer. After the gelatin had dissolved, and with the stirrer operating at 100 rpm, the internal phase described above (109 g) was added to the reactor. Once this internal phase had been emulsified in the gelatin solution, PVD (200 g of a 19 percent aqueous solution, available form Aldrich Chemical Company) was slowly added to the reactor, the temperature of which was maintained at 50° C., with stirring at 100 rpm. Approximately 15 minutes after the PVD addition was complete, the temperature of the reactor jacket was lowered to 30° C., and stirring was continued for an additional 24 hours.

The emulsion thus produced was slot coated, using a 125 μm coating slot on to a 127 μm thick indium-tin oxide (ITO) coated poly(ethylene terephthalate) film, the emulsion being deposited on the ITO-coated surface of the film, and the resultant coated film was dried in an oven at 60° C. for 1 hour.

Separately, a custom polyurethane lamination adhesive (having a molecular weight of approximately 20,000) was coated on the a release sheet to form a dried adhesive layer 55 μm thick, and the resultant coated sheet was cut to a size slightly larger than that of the dried emulsion-coated film. The two sheets were then laminated together (with the lamination adhesive in contact with the dried emulsion layer) by running them through a Western Magnum roll laminator with the top roll set at 279° C. and the bottom roll set at 184° C. to form a front plane laminate as described in the aforementioned 2004/0027327. The front plane laminate was then cut to the desired size, the release sheet removed, and the lamination adhesive layer thereof laminated to a backplane comprising a polymeric film covered with a graphite layer, the lamination adhesive being contacted with the graphite layer. This second lamination was effected using the same laminator but with a top roll temperature of 259° C. and a bottom roll temperature of 184° C. The laminated pixels were cut out using a laser cutter, and electrical connections applied to produce experimental single-pixel displays suitable for use in the electro-optic tests described in Example 7 below.

EXAMPLE 4

PVP Medium

Example 3 was repeated except that the gelatin solution was formed using only 100 mL of water and the PVD was replaced with poly(vinylpyrrolidone) (200 g of a 19 percent aqueous solution, available from Aldrich Chemical Company).

EXAMPLE 5

PAAM Medium

Example 4 was repeated except that the PVP was replaced with polyacrylamide (240 g of a 10 percent aqueous solution).

EXAMPLE 6

PVOH/PVP Medium

Example 4 was repeated except that only 101.3 g of internal phase was added to the gelatin solution, and after this internal phase had been emulsified the same PVP solution as in Example 4 (194.7 g of the 19 percent solution) was slowly added to the reactor. Approximately 15 minutes after the PVP addition was complete, the temperature of the reactor jacket was lowered to 30° C., and stirring was continued for an additional 5 hours. Poly(vinyl alcohol) (67.8 g of a 10 percent aqueous solution, 87-89 percent hydrolyzed, available from Aldrich Chemical Company) was then added to the reaction mixture, and stirring was continued at the same temperature before coating of the emulsion and conversion of the coating to experimental single-pixel displays in the same manner as in Example 3.

EXAMPLE 7

Electro-Optic Performance

Samples of the single-pixel displays produced in Examples 3-6 above were placed in chambers maintained at ambient temperature and 70, 80 and 90 percent relative humidity (RH). At intervals, the pixels were driven between their extreme black and white optical states using 1 second, 15 V drive pulses, with 3 seconds between pulses. To provide controls, each chamber was also provided with a single-pixel display prepared in the same way but using an encapsulated electrophoretic medium prepared substantially as described in Example 30 of the aforementioned U.S. Pat. No. 6,822,782; this control is designated "ENCAP" in the relevant Figures discussed below.

Figure 5:
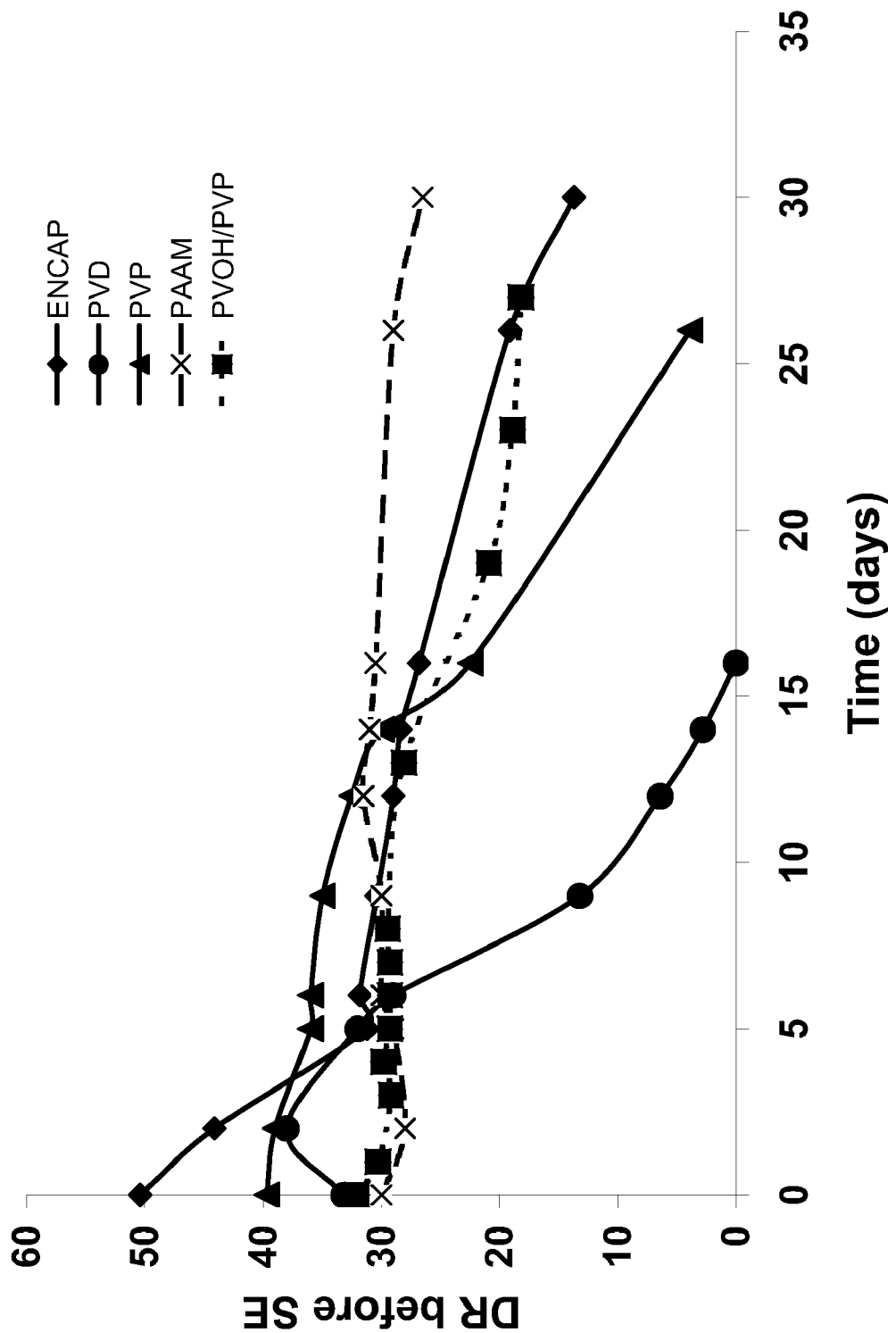
FIGS. 5 to 9 are graphs showing the electro-optic properties of certain media of the present invention after exposure for varying times to high relative humidity environments, as described in Example 7 below.
Figure 6:
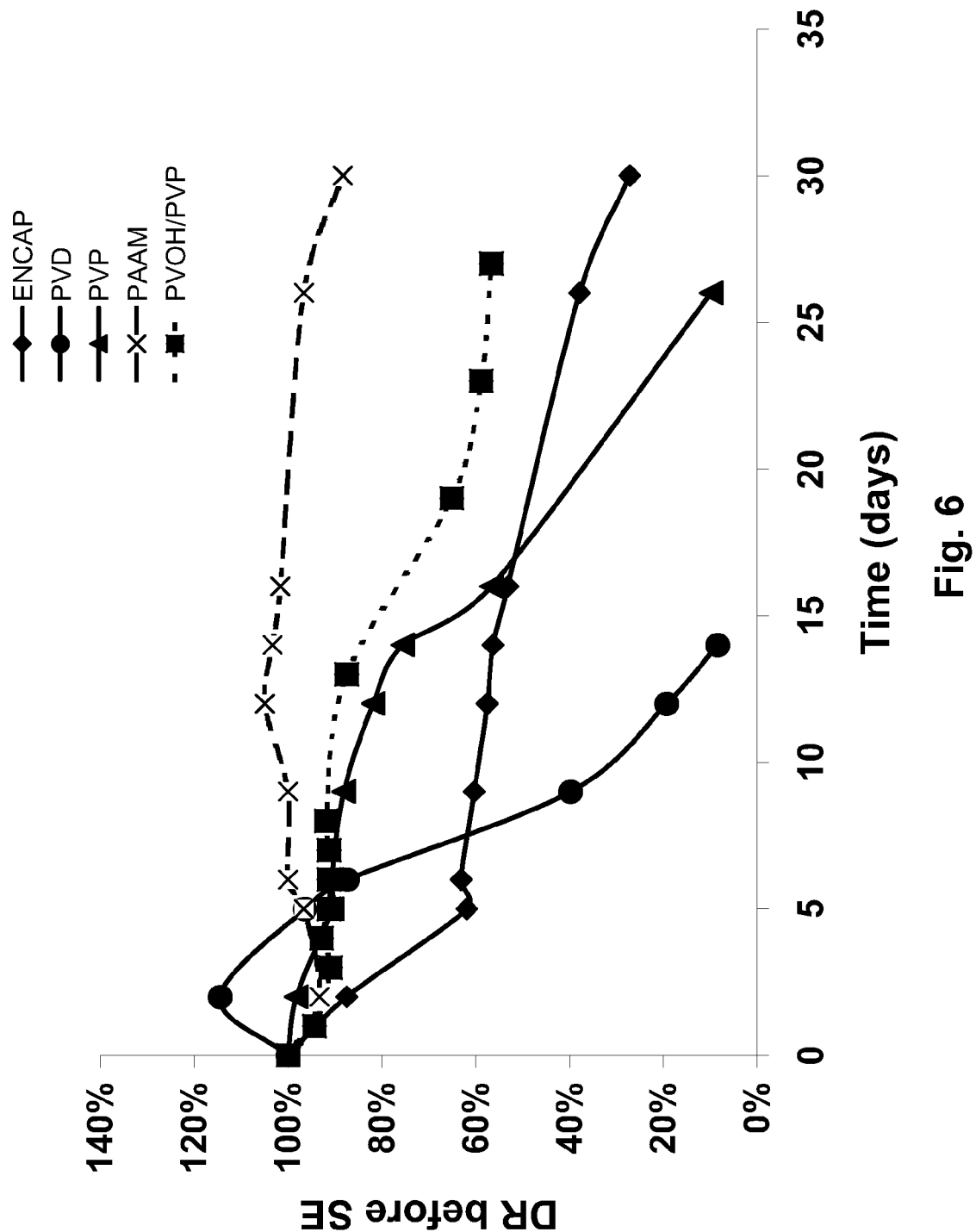
Figure 7:
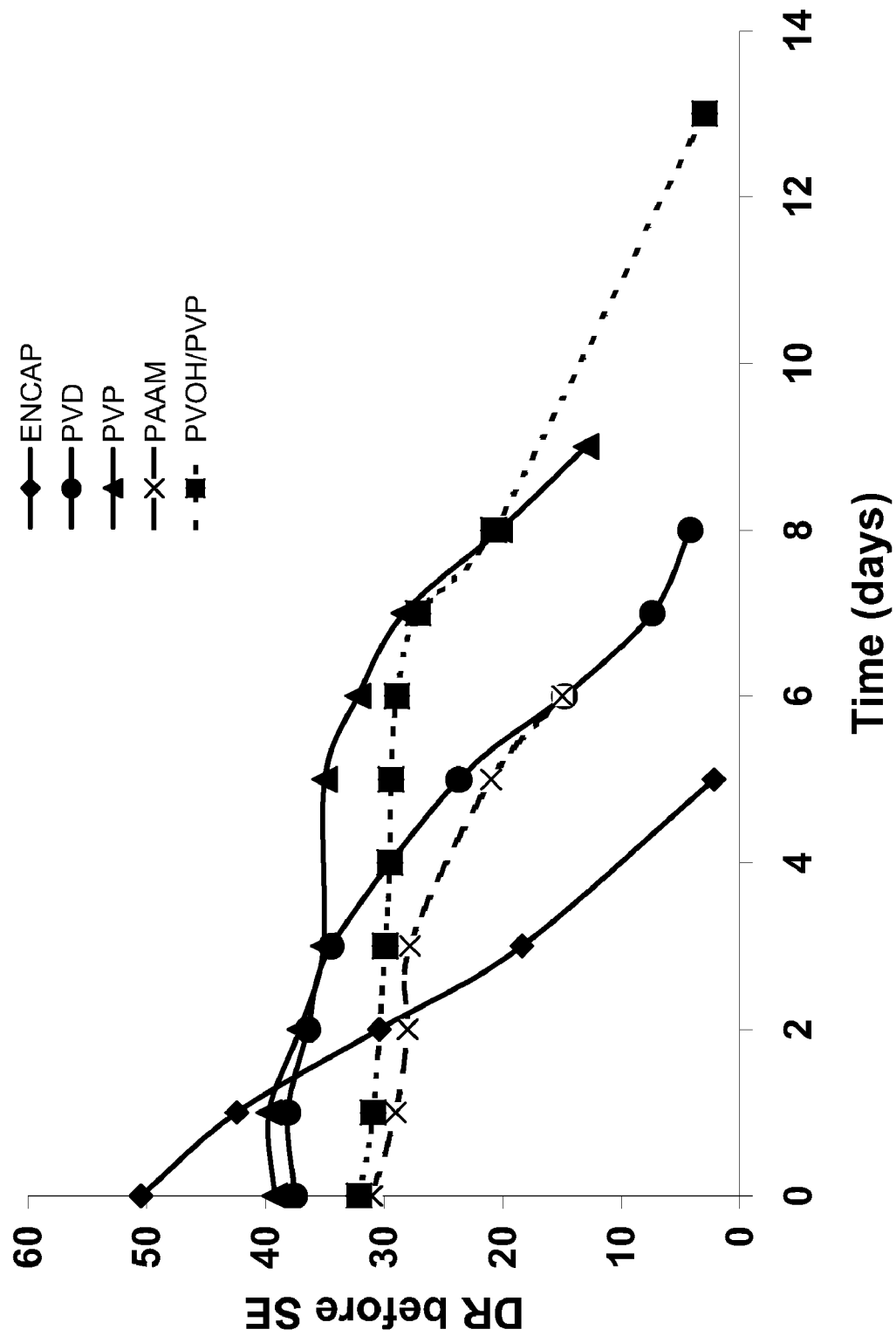
Figure 8:
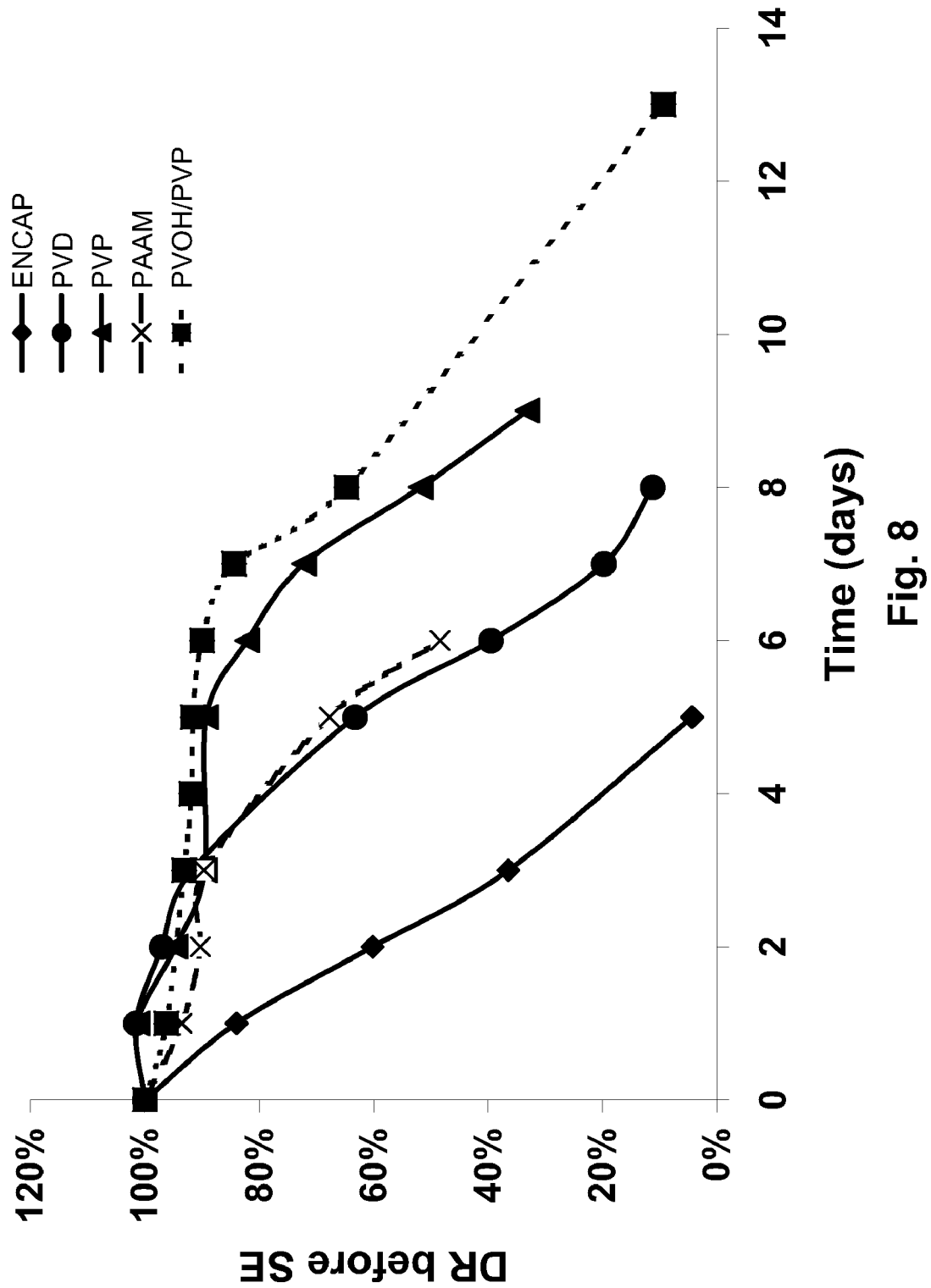
Figure 9:
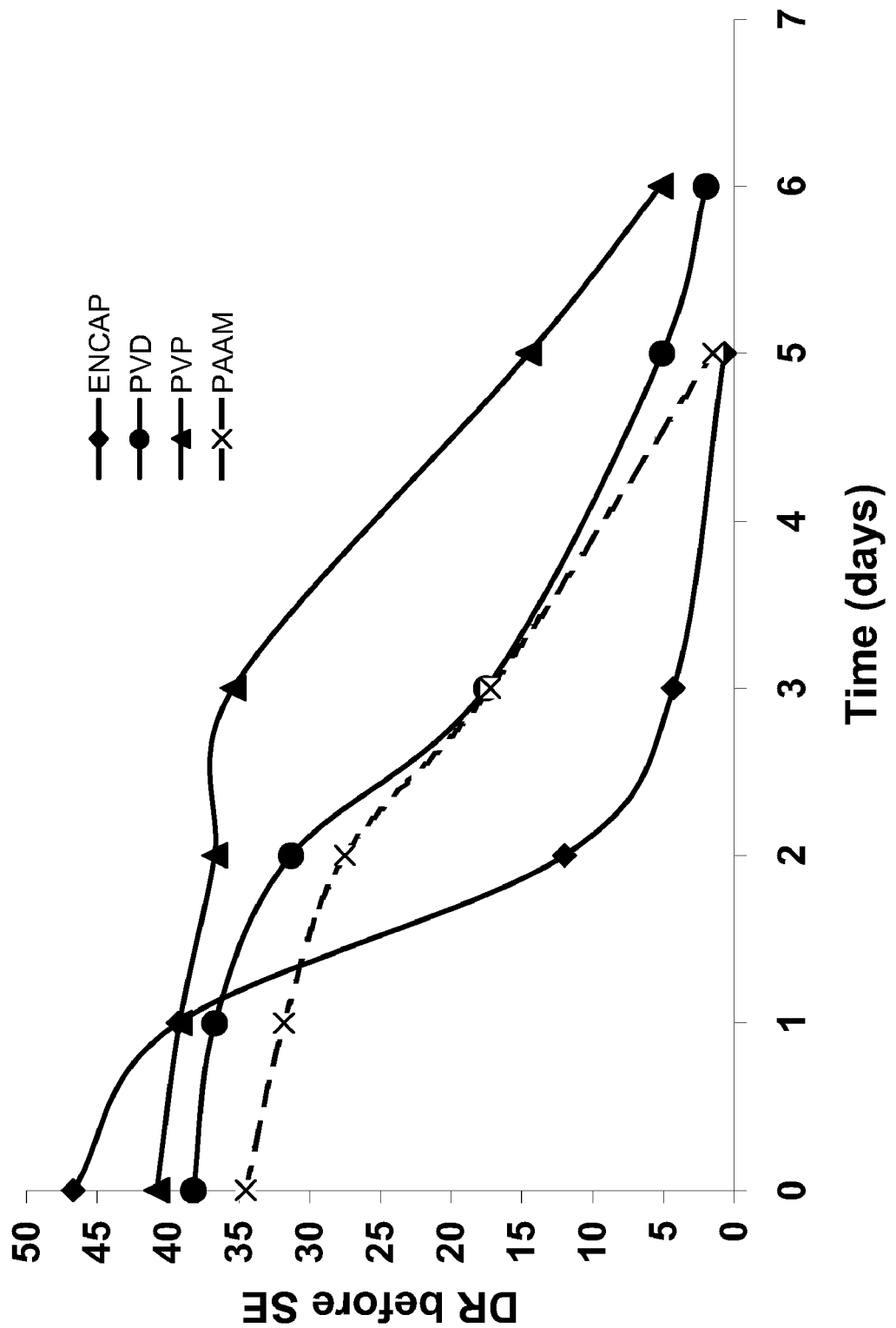

FIG. 5 shows the change in dynamic range (the difference between the $L^*$ values of the two extreme optical states of the medium, where $L^*$ has the usual CIE definition) for each medium against the exposure time of the medium to the 70 percent RH chamber, while FIG. 6 shows the same data plotted as a percentage of the original dynamic range of each medium. FIGS. 7 and 8 are similar to FIGS. 5 and 6 respectively but show data for the media samples exposed to 80 percent RH. FIG. 9 is similar to FIG. 5 but shows data for the media samples exposed to 90 percent RH.

From FIGS. 5 and 6, it will be seen that the dynamic range of the encapsulated medium decreased by over 40 percent after 14 days exposure to 70 percent RH, this drop increasing to about 75 percent after 30 days. Of the polymer-dispersed media, only the PVD-based medium suffered a substantial drop in dynamic range over the same 14 day period, the other three polymer-dispersed media all maintaining at least about 80 percent of their original dynamic range. The PAAM medium showed outstanding results, retaining more than 80 percent of its dynamic range after 30 days. The results at 80 percent RH, shown in FIGS. 7 and 8 are similar, although the losses in dynamic range are greater. In this case, the encapsulated medium suffered a total loss of dynamic range (i.e., was no longer capable of switching between dark and light optical states) after 5 days at 80 percent RH, whereas all four polymer-dispersed media survived longer, with the PVP- and PVOH/PVP-based polymer-dispersed media maintaining about 80 percent of their original dynamic range after 7 to 8 days. The results at 90 percent RH, shown in FIG. 9, are similar to those at 80 percent RH shown in FIG. 7, although the decline in dynamic range is significantly faster at 90 percent RH. Again, it will be seen that at 90 percent RH the dynamic range of the encapsulated medium decreased rapidly, while the polymer-dispersed media were more resistant to the high RH; at the end of the test, the PVP-based polymer-dispersed medium still had a dynamic range of 15.1 L* units.

EXAMPLE 8

Self-Erasing

The PVD- and PVP-based polymer-dispersed media prepared as described above were tested for their self-erasing behavior. For this purpose, single-pixel displays containing each medium were driven to their black and white extreme optical states in the same way as in Example 7 above. The white and dark states of the pixel were measured at the end of the drive pulse and 3 seconds later, the difference between the two measurements representing the self-erasing effect of the pixel. The results are shown in the Table below, in which all values are in L* units, the row headed "W" shows the white state at the end of the drive pulse, "WSE" represents the white state 3 seconds later, and "ΔW" represents the difference between the two due to self-erasing, with "D", "DSE" and "ΔD" showing the same parameters of the dark state. "DR" represents the dynamic range without self-erasing (i.e., W-D), while "DRSE" represents the dynamic range allowing for self-erasing (i.e., WSE-DSE) and "Total SE" represent the total loss of dynamic range due to self-erasing (i.e., ΔW+ΔD).

TABLE

|      | PVD  | PVP  |
|------|------|------|
| W    | 62.5 | 63.8 |
| WSE  | 54.0 | 57.8 |
| ΔW   | 8.5  | 6.0  |
| D    | 24.0 | 16.7 |
| DSE  | 28.0 | 18.0 |
| ΔD   | 4.0  | 1.3  |
| DR   | 38.5 | 47.1 |

TABLE-continued

|          | PVD  | PVP  |
|----------|------|------|
| DRSE     | 26.0 | 39.8 |
| Total SE | 12.5 | 7.3  |

It will be appreciated that it is normally the dynamic range allowing for self-erasing which is decisive in a user's perception of the medium, since typically an image is written on an electro-optic medium over a short period of a second or less, and then the image is allowed to remain for an extended period while the user reads the image, so that substantially all of this reading takes place after the contrast between the light and dark portions of the image has been reduced by any self-erasing to which the medium is subject. It will be seen from the Table that the PVP-based medium displayed substantially less self-erasing, and a substantially greater dynamic range allowing for self-erasing, than the PVD-based medium, and hence the PVP-based medium would be more attractive to a user.

To sum up, the foregoing Examples show that polymer-dispersed electrophoretic media display improved performance in high relative humidity conditions, as compared with encapsulated electrophoretic media. Careful choice of the continuous phase of a polymer-dispersed medium, and especially the use of non-ionizable or crystalline polymers in the continuous phase can further enhance high RH performance. Polymer-dispersed electrophoretic media can be produced economically, and appear to have better mechanical properties than similar encapsulated media.

Apart from the use of a two-phase structure rather than capsules contained in a binder, electrophoretic displays of the present invention resemble prior art encapsulated electrophoretic displays, and hence, as already noted, the present displays can make use of any known materials and processes for the production of such displays. Various optional features of such electrophoretic displays will now be described. Some of the following description may make use of the term "capsules" but such references should be understood to include droplets surrounded by a continuous phase in the polymer-dispersed media of the present invention.

In electrophoretic displays, the particles may be oriented or translated by placing an electric field across the capsule. The electric field may include an alternating-current field or a direct-current field. The electric field may be provided by at least one pair of electrodes disposed adjacent to a display comprising the capsule.

Throughout the following description, reference will be made to printing or printed. Printing is intended to include all forms of printing and coating, including: premetered coatings such as patch die coating, slot or extrusion coating, slide or cascade coating, and curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques. A "printed element" refers to an element formed using any one of the above techniques.

Figure 10:
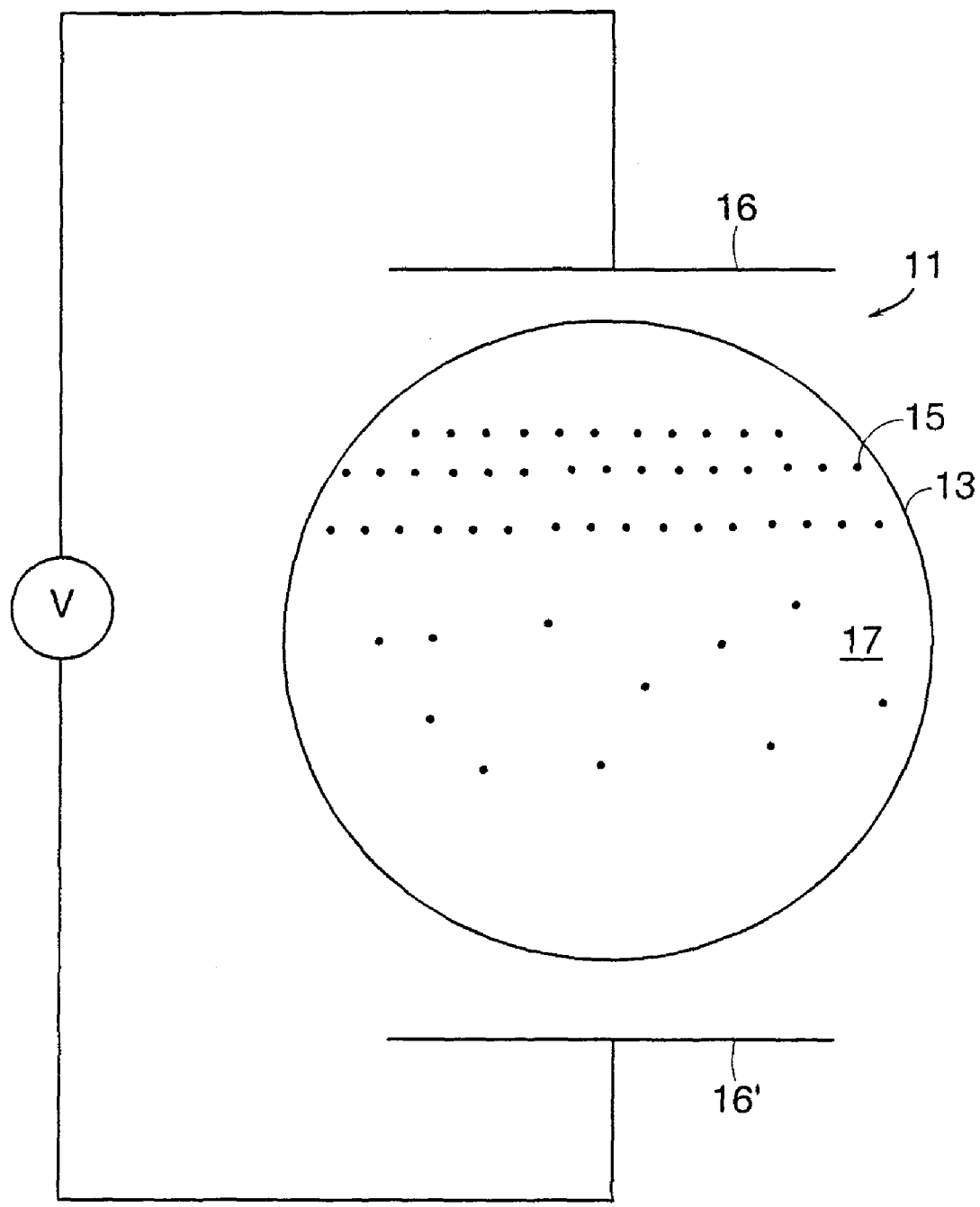
FIG. 10 is a schematic representation of encapsulated light scattering particles.

FIG. 10 shows an electrophoretic display of the invention. The binder 11 includes at least one capsule 13, which is filled with a plurality of particles 15 and a dyed suspending fluid 17. In one embodiment, the particles 15 are titania particles. When a direct-current electric field of the appropriate polarity is applied across the capsule 13, the particles 15 move to the viewed surface of the display and scatter light. When the applied electric field is reversed, the particles 15 move to the rear surface of the display and the viewed surface of the display then appears dark.

Figure 11:
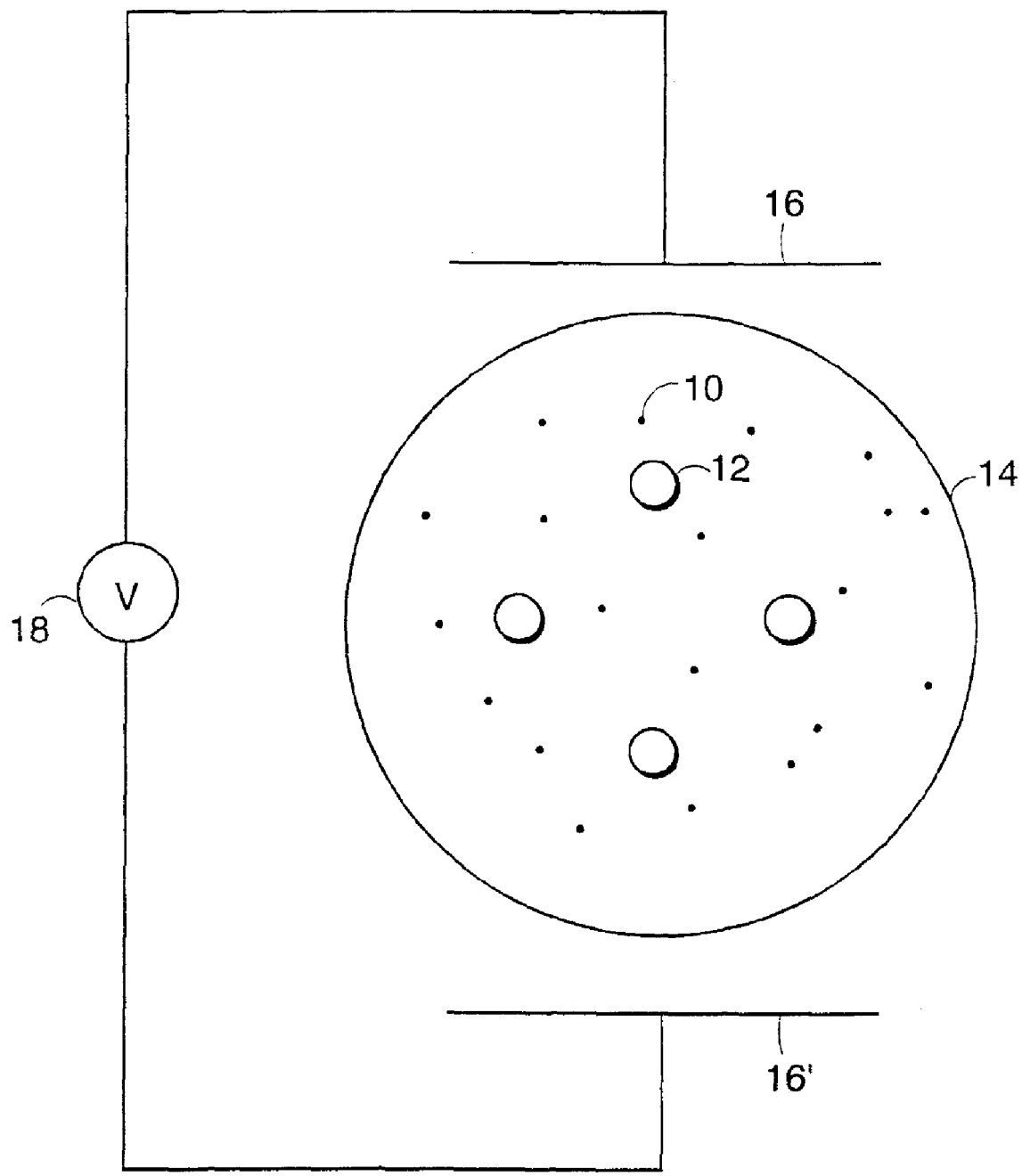
FIG. 11 shows a capsule containing particles in a suspending fluid and having a pair of electrodes disposed adjacent thereto.

FIG. 11 shows an electrophoretic display of the invention. This display comprises anisotropic particles 10 and a second set of particles 12 in a capsule or droplet 14. The capsule has electrodes 16 and 16' disposed adjacent it. The electrodes are connected to a source of voltage 18, which may provide an alternating-current (AC) field or a direct-current (DC) field to the capsule 14. In this display, the anisotropic particles 10 are oriented by an AC field so as to allow light to pass through the capsule. Brownian motion normally slowly restores the particles to an isotropic state. In this display, a clear index of refraction matched second set of particles 12 is, however, used to provide internal turbulence and disorient the anisotropic particles. Applying a DC field that is switched back and forth at a much lower frequency causes the second set of particles to translate and disturb any oriented anisotropic particles. This will cause the display to reset to its scattering state much more quickly. The display cell appears dark upon disorientation of the anisotropic particles. This scheme will work in an encapsulated, polymer dispersed, or normal liquid cell.

Figure 12:
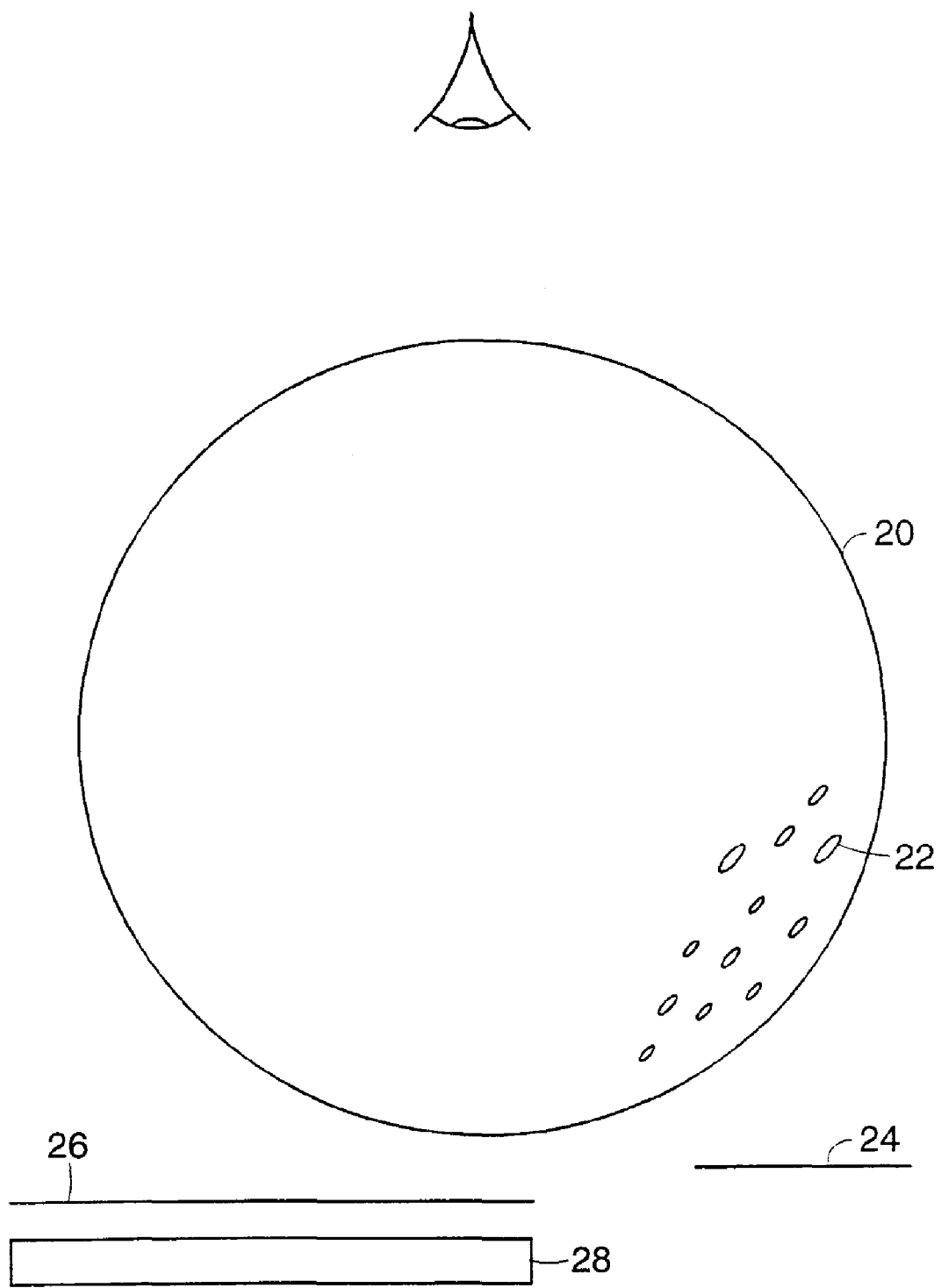
FIG. 12 shows a capsule containing light-absorbing particles in a suspending fluid and having a reflective or retroreflective substrate disposed at the bottom face of the capsule. The particles are shown moved toward one of the pair of electrodes so that light can pass through the capsule and be reflected by the substrate.
Figure 13:
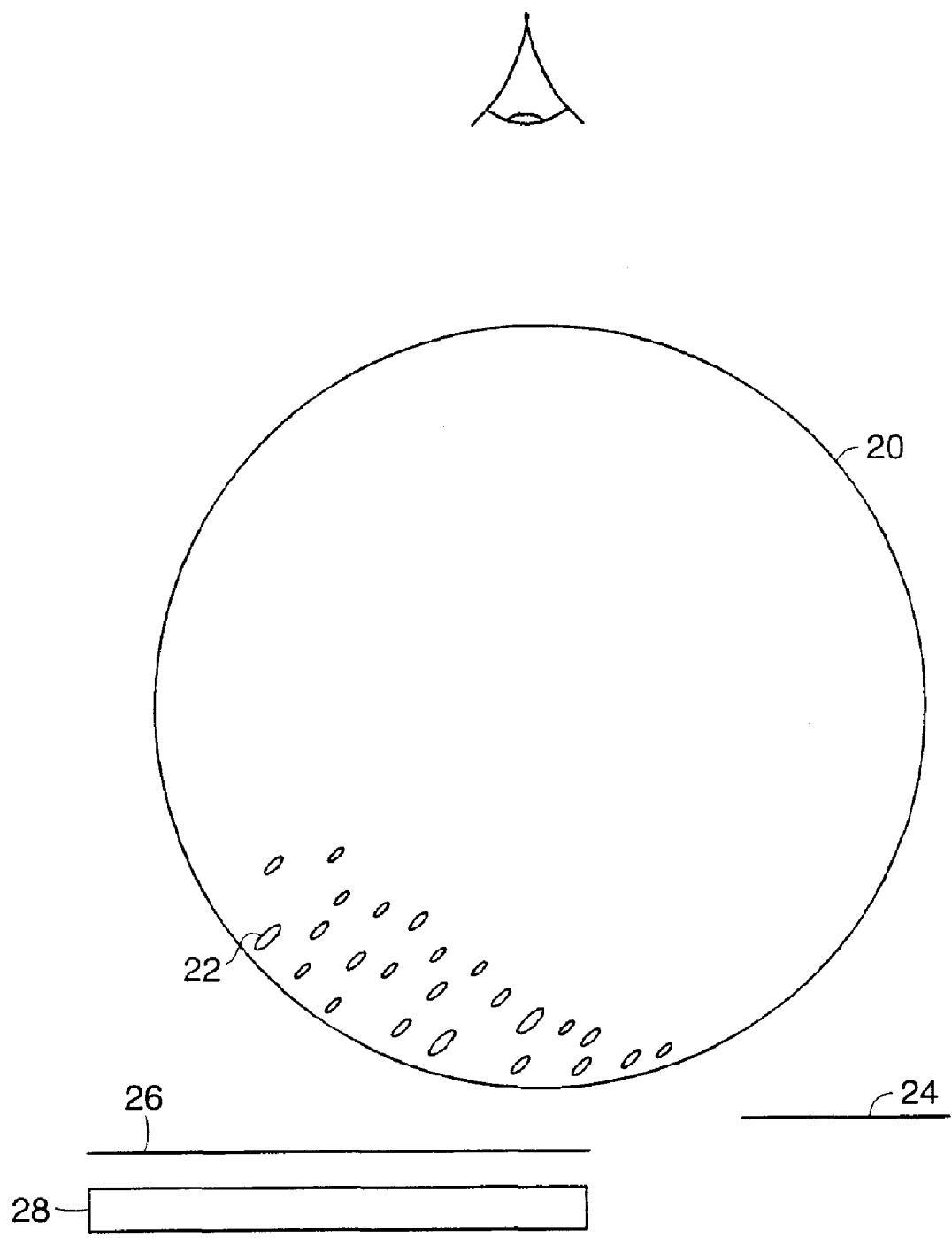
FIG. 13 shows the capsule of FIG. 12 in which the particles are moved to block light from reaching the substrate, thereby preventing light from being reflected by the substrate.

In another embodiment of the invention, an electrophoretic display that uses a retroreflecting surface is described. This implementation need not be encapsulated, but rather may also be embodied in the form of a standard electrophoretic display. FIGS. 12 and 13 show such a display.

In FIG. 12, capsule or droplet 20 is filled with a suspending fluid, which may be a fluid of high resistivity and particles 22. When the particles are attracted towards electrode 24 by the application of an electric field, the particles take up a minority of the viewable area of the display. This exposes clear electrode 26 and allows the light to reflect off the surface 28. This surface may be composed of glass spheres, a diffractive reflecting layer, such as a holographically formed reflector, for example, any other known retroflecting surface, or any other surface which contrasts with the particles. The capsule then has the appearance of substrate 28.

In FIG. 13, the second state of the capsule is displayed. Particles 22 contained within capsule 20 migrate towards electrode 26 by the application of an electric field. These particles thus obscure surface 28, and the capsule, when viewed from the top, then appears to have the properties of the particle.

Figure 14:
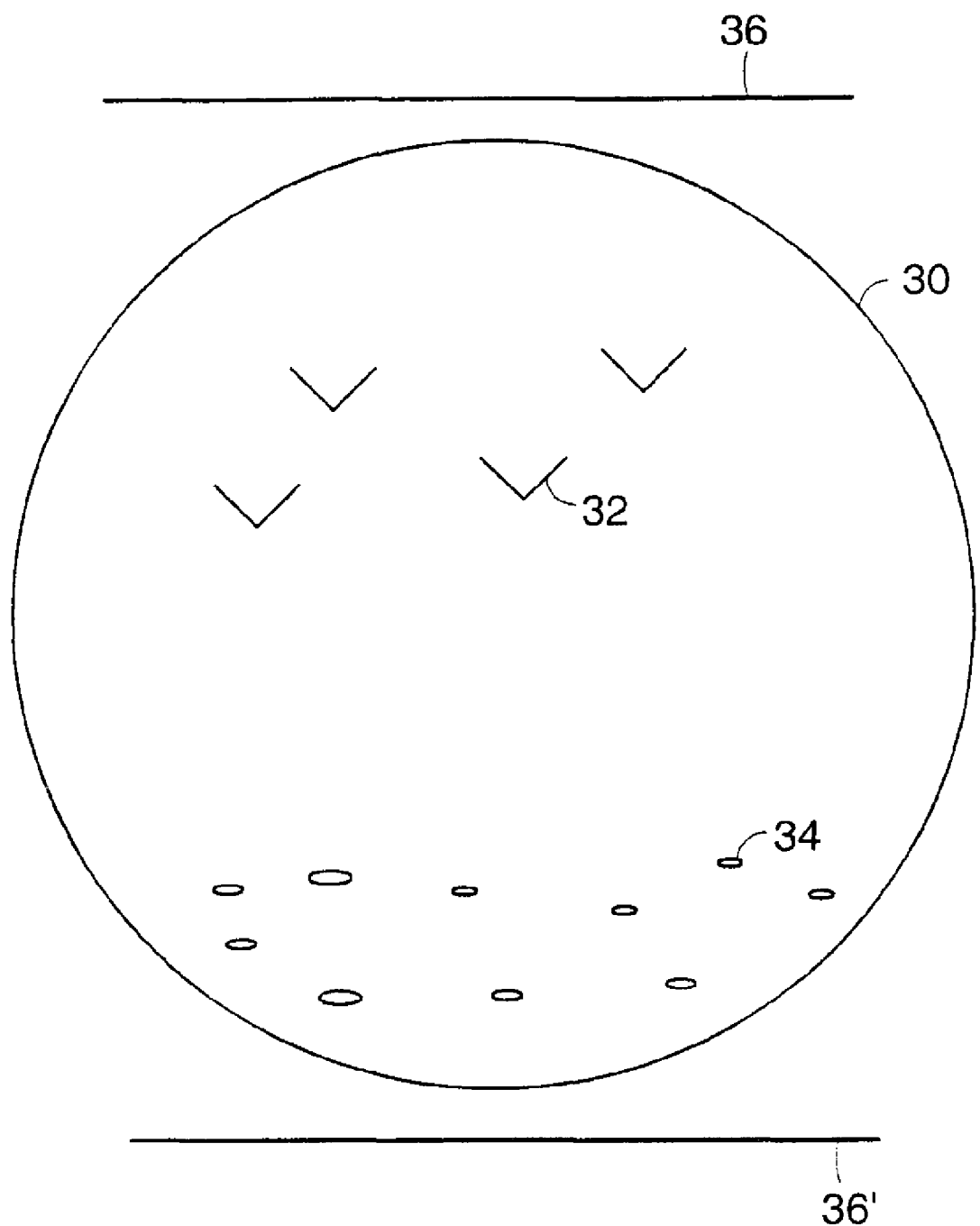
FIG. 14 shows a capsule containing light-absorbing particles and retroreflecting particles.

FIG. 14 shows another embodiment of the invention. In this embodiment, a reflective display may be made selectively retroreflective by manipulating charged particles to either block a retroreflective light path or create a retroreflective surface. In this embodiment, capsule or droplet 30 contains retroreflecting particles 32 and black particles 34. The retroreflective particles may include retroreflecting corner cubes or hemispherically reflective coated particles, for example. Upon application of an appropriate voltage between electrodes 36 and 36', the black particles 34 may move to the viewing surface of the display creating a dark state. When the retroreflective particles may move to the top surface of the display by application of a different electric field, they create a retroreflective surface resulting in a bright state.

Figure 15A:
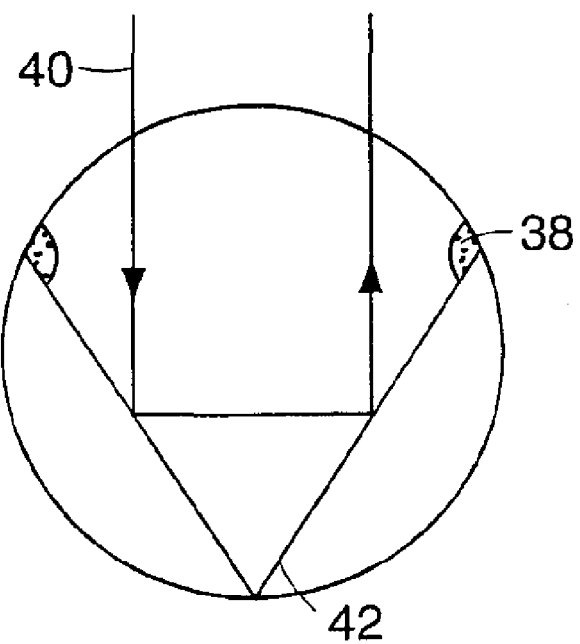
FIG. 15A shows a capsule containing a reflecting corner cube at its bottom face and particles. In this illustration, the particles are positioned so that light can pass through the capsule and be reflected by the corner cube.
Figure 15B:
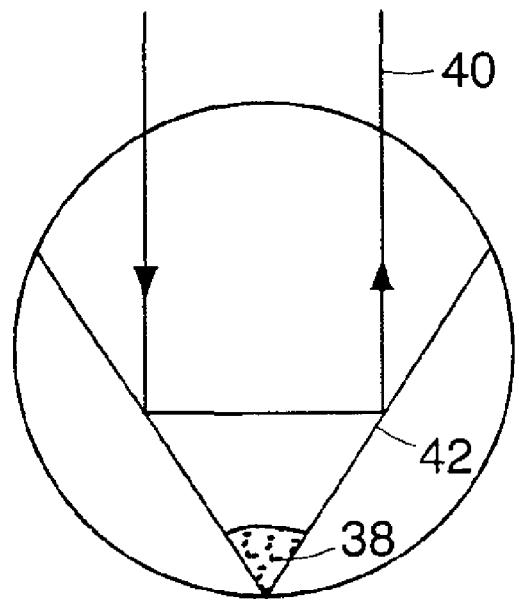
FIG. 15B shows a capsule containing a reflecting corner cube at its bottom face and particles. In this illustration, the particles are positioned so that light can pass through the capsule and be reflected by the corner cube.
Figure 15C:
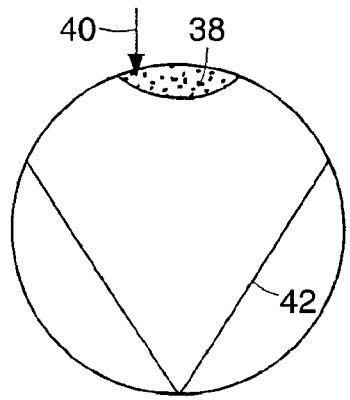
FIG. 15C shows a microcapsule containing a reflecting corner cube at its bottom face and particles. In this illustration, the particles are positioned so that light cannot pass through the capsule and be reflected by the corner cube.

In another embodiment, a display which may be made selectively retroreflective is described. In general, the display works by manipulating charged particles to either block a retroreflective light path or create a retroreflective surface. The particles move (electrophoretically, for example) within a capsule. FIGS. 15A-15C show the contemplated configurations.

The capsule or droplet is situated in a two or three-dimensional corner cube-type structure, which may be created by embossing or other means. In two states, as shown in FIGS. 15A and 15B, the particles 38 allow light 40 to pass through and be reflected by the corner cube 42. In a third state, however, as shown in FIG. 15C, the particles 38 block most of the incident light 40 from being retroreflected by the corner cube 42.

Figure 16:
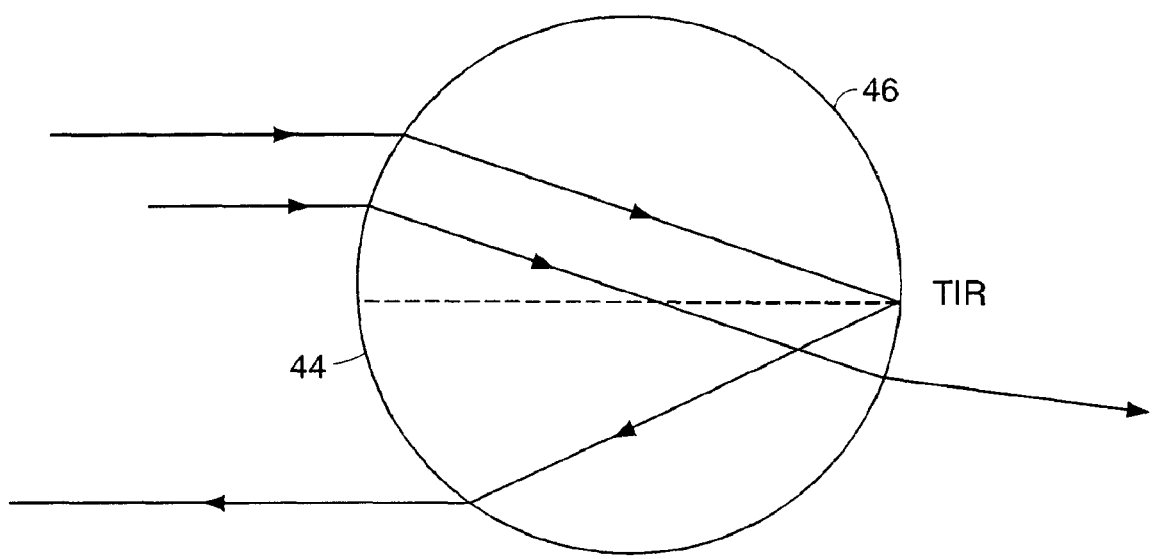
FIG. 16 shows how a capsule may reflect light.

In another embodiment, shown in FIG. 16, a single capsule or droplet acts as a retroreflector, much as a glass bead does. Only light that enters the incident side 44 at a vertical displacement at a distance from the center greater than a critical distance will strike the totally internal reflecting (TIR) side 46 at an angle great enough to be totally internally reflected. This light strikes the TIR side near its center. Thus, on the incident side 44, the retroreflective effect occurs away from the center axis. On the TIR side 46, however, most retroreflective action occurs at the vertical center.

Figure 17A:
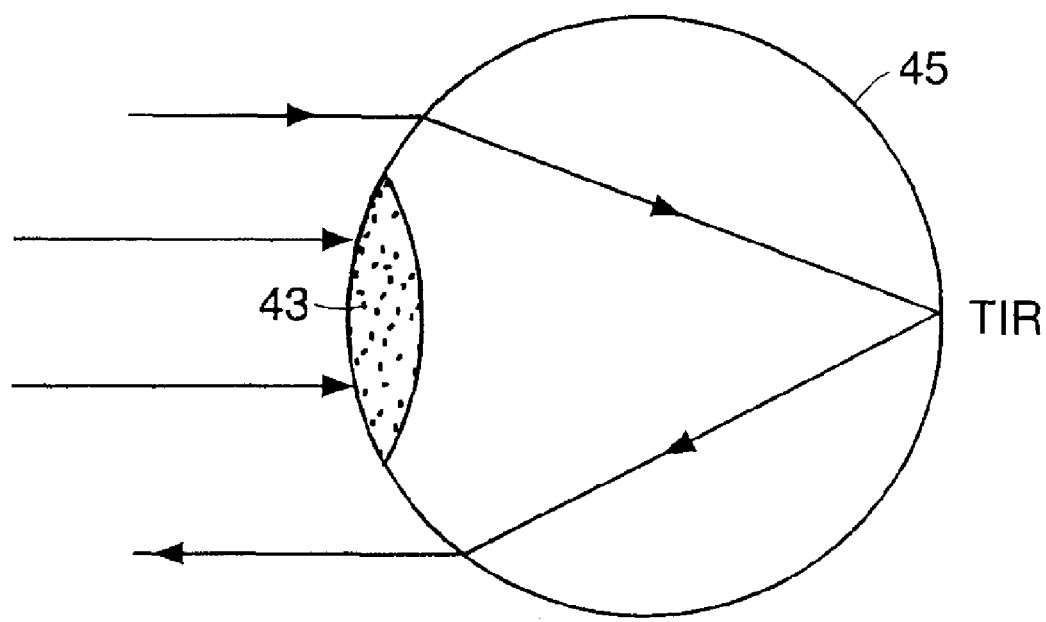
FIG. 17A shows a capsule of FIG. 16 in which particles contained within the capsule are positioned so as to allow light to enter the capsule and be reflected.
Figure 17B:
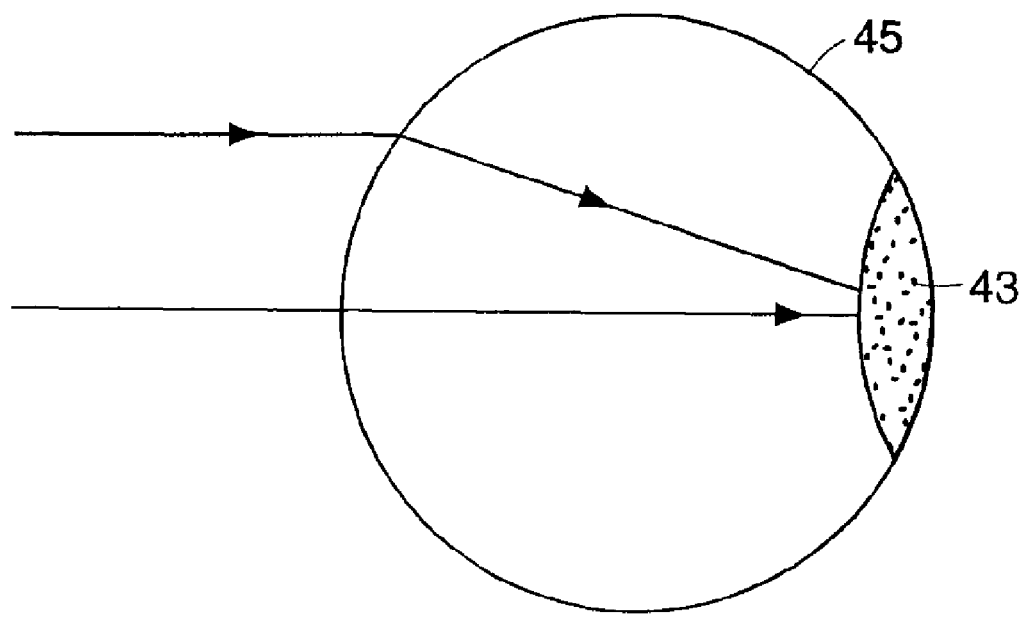
FIG. 17B shows a capsule of FIG. 16 in which particles contained within the capsule are positioned so as to prevent light entering the capsule from being reflected.

Thus, a retroreflective electronically addressable display can be constructed in which the retroreflective and non-retroreflective states are as illustrated in FIGS. 17A and 17B. In FIG. 17A, the particles 43 are shown toward the front face of the capsule 45. This configuration allows light to enter and be reflected from the TIR side of the capsule. In FIG. 17B, the particles 43 are shown toward the bottom face of the capsule 45. In this configuration, the particles block the path of the light and thereby prevent it from being reflected from the TIR side of the capsule.

In short, any configuration in which particles can be rearranged in a capsule or capsular cavity in a binder, with or without an external physical retroreflector, to switch from a retroreflected to a non-retroreflected state is contemplated.

In another embodiment of the invention, a multi-color, encapsulated or polymer-dispersed electrophoretic display is contemplated. In this embodiment, the display, which may comprise a capsule, is filled with at least one suspending fluid and at least two, and preferably at least three, species of particles. These particles are of different colors and possess substantially non-overlapping electrophoretic mobilities. As used herein, the phrase "substantially non-overlapping electrophoretic mobilities" means that less than 25%, and preferably less than 5%, of the particles of different colors have the same or similar electrophoretic mobilities. As an example, in a system having two species of particles, less than 25% of particles of one species would have the same or similar electrophoretic mobilities as the particles in the other species. Finally, in an alternative embodiment, one of the colors may be represented by a dye dispersed in the suspending fluid.

As an example of a multi-color, encapsulated electrophoretic display, there may be magenta particles with an average zeta potential of 100 mV, cyan particles with an average zeta potential of 60 mV, and yellow particles with an average zeta potential of 20 mV. To address this display to the magenta state, all the particles are pulled to the back of the cell by applying an electric field in one direction. Subsequently, the field is reversed for just long enough for the magenta particles to move to the top face of the display cell. The cyan and yellow particles will also move in this reversed field, but they will not move as quickly as the magenta particles, and thus will be obscured by the magenta particles.

To address the display to the cyan state, all the particles are pulled to the back of the cell by applying an electric field in one direction. Then the field is reversed for just long enough for the magenta and cyan particles to move to the top face of the display cell. The field is then reversed again and the magenta particles, moving faster than the cyan particles, leave the cyan particles exposed at the top of the display.

Finally, to achieve a yellow display, all the particles are pulled to the front of the display. The field is then reversed and the yellow particles, lagging behind the magenta and cyan particles are exposed at the front of the display.

A display using field effect luminescence is also an embodiment of the invention. An example of a field effect luminescent embodiment of the invention requires about 300-400 Hz AC voltage. This high frequency does not, however, produce any net displacement of the luminescent particles. The luminescent particles are generally conductive. Encapsulation in a polymer or other dielectric material is, therefore, useful for reducing conductivity.

Figure 18:
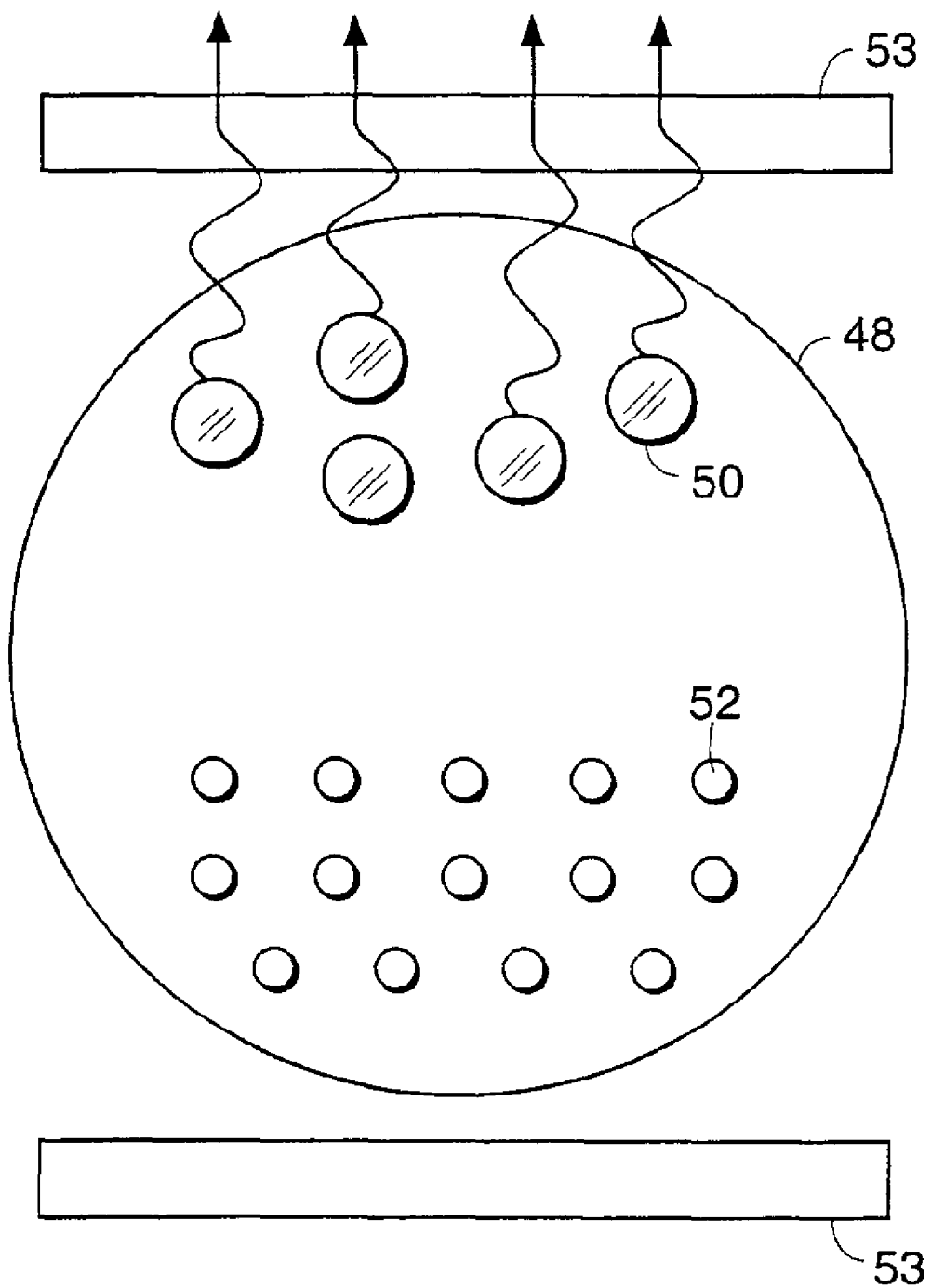
FIG. 18 shows a capsule containing luminescent particles and light-absorbing particles. In this illustration, the luminescent particles are positioned toward the top face of the capsule, thereby providing light.
Figure 19:
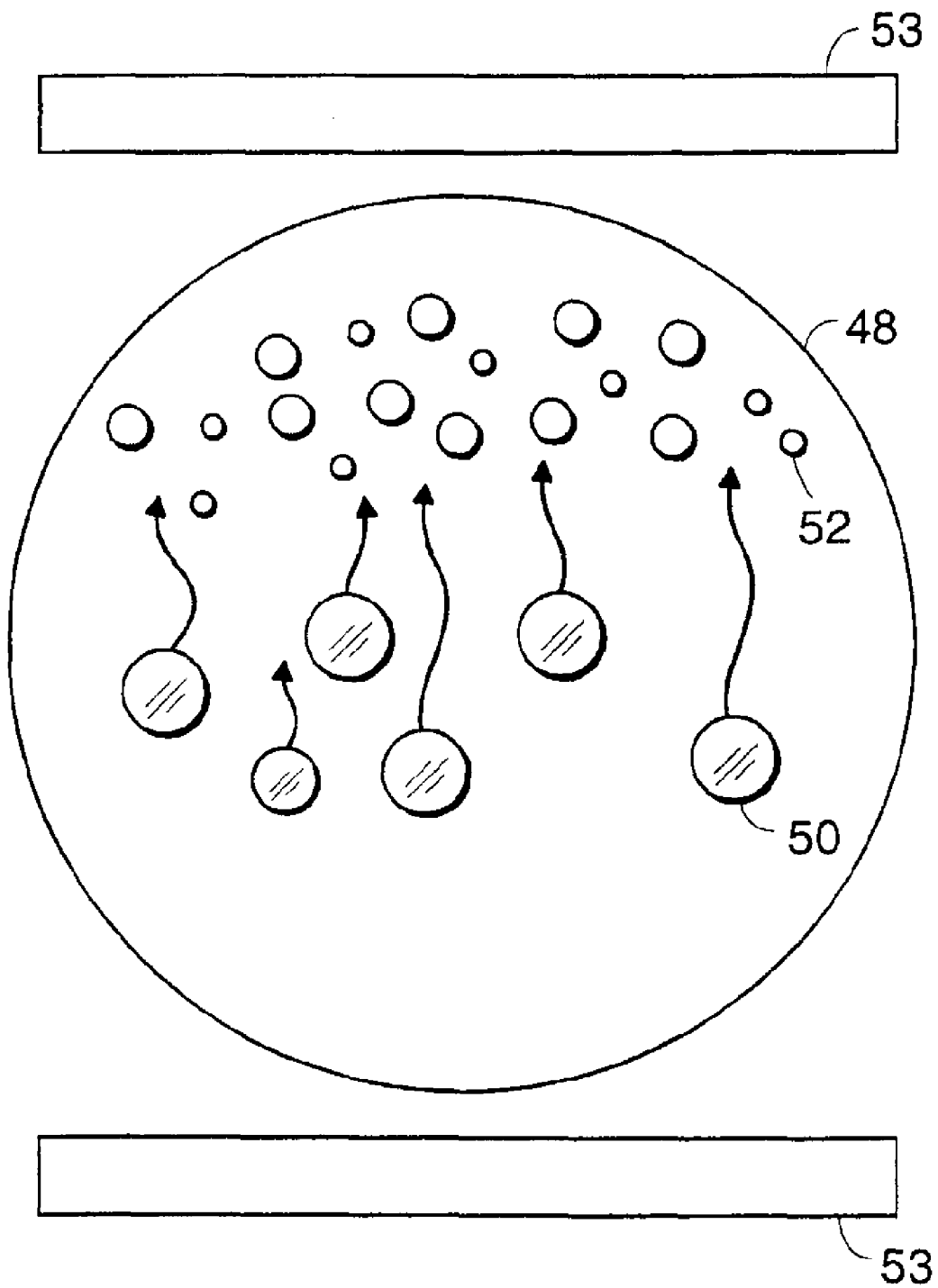
FIG. 19 shows a capsule of FIG. 18 in which the light-absorbing particles are positioned toward the top face of the capsule, thereby blocking light from exiting the capsule.

FIGS. 18 and 19 show a display cell 48 of this embodiment in its white and darkened states, respectively. The luminescent particles 50 may be, for example, zinc sulfide particles, which emit light when excited by an AC electric field. The AC field can be superimposed on top of, or after, a DC field used for addressing the particles or dye. A second species of particle 52 in the fluid blocks the light being emitted from the particles when the display is addressed to its darkened state.

Upon application of a DC field by the two electrodes 53, the luminescent particles 50 migrate to the viewing face of the display 48 and excited to emit light, resulting in a bright state. Upon application of an electric field of the opposite polarity, the luminescent particles 50 migrate to the back face of the display 48, and the light-blocking particles 52 block the light being emitted from the luminescent particles 50 from the viewing face of the display, resulting in a dark state. The luminescent particles may be photoluminescent or electroluminescent. Photoluminiscent particles may be stimulated by continuous ultraviolet, or other, radiation from the front of the display, or the illumination source may be behind the display. In the latter case, the dye or second species of particle allows ultraviolet radiation to pass through the display.

In a preferred embodiment of the invention, the electrophoretic display comprises a capsule or droplet in a binder, the capsule or droplet containing a plurality of particles which are themselves encapsulated pigments, dyes, dispersions or dye solutions. In this embodiment, a pigment, for example, is encapsulated to form particles ranging from tens of nanometers to a few micrometers, which are then dispersed and encapsulated or polymer-dispersed. Examples include scattering pigments, absorbing pigments, or luminescent particles. These particles are then used as the electrophoretic particles. Furthermore, in this embodiment of the invention, it is possible to encapsulate a dye solution and use it as the electrophoretic particle.

Furthermore, in this embodiment, it is possible to encapsulate disperse not only a fluid dye or a particle, but also a fluid dye plus solid particles. These particles possess their own optical or electrical properties, which may complement those of the dye.

These encapsulated particles may be useful for both encapsulated electrophoretic displays and non-encapsulated electrophoretic displays. The average diameter for a particle is in the range of about 10 nm to about 5 µm. These capsules need to be small enough to be mobile within the larger capsule or droplet, which typically has a size ranging from about 5 µm to about 400 µm in diameter.

In another embodiment of the invention, an encapsulated or polymer-dispersed electro-osmotic display is described. In this embodiment, a porous or gel-like internal phase of a capsule is swelled (i.e., filled) and drained by the electro-osmotically induced motion of a refractive index matching fluid (i.e., the difference between the refractive index of the fluid and the refractive index of the internal phase is preferably within 0.5). When the pores of the material are filled with the fluid, the capsule acts as a homogeneous optical material, thus largely transmitting or refracting light according to the bulk properties of the medium. When the pores are vacated by the mobile fluid, however, a larger quantity of optical index mismatches are present and light scattering is greatly increased.

The porous internal phase of the capsule may include a cellulosic material, such as an alkylcellulose. Examples of alkylcelluloses include, but are not limited to, methylcellulose, methylhydroxyethylcellulose, hydroxyethylcellulose, hydroxypropylmethylcellulose, carboxymethylcellulose, and sodium carboxymethylcellulose.

In other embodiments of the invention, it is preferred that the capsules or droplets of the electrophoretic display have a non-spherical shape. There are some optical losses associated with encapsulated or polymer-dispersed electrophoretic displays compared to unencapsulated displays due to absorption or scattering by the capsule materials, and absorption or scattering of the binder. Many of these losses result from spherical cavities. It is, therefore, advantageous to provide a non-spherical microcapsule, specifically a close packed array of non-spherical cavities. It is desirable that the top of the microcapsule have a flat surface that is co-planar with the viewing electrode and vertical, or nearly vertical, walls. The capsule may be a slightly flattened sphere, a heavily flattened sphere, essentially cylindrical in shape, or a multi-faceted polyhedron, for example.

A display with non-spherical capsules or droplets may comprise a binder having oil-containing cavities that are non-spherical in shape. These oil-containing cavities may be elastomeric capsules. In a preferred embodiment, the aspect ratio (i.e., ratio of width to height) of these cavities is preferably greater than about 1.2. The aspect ratio is more preferably greater than about 1.5, and, in a particularly preferred embodiment, the aspect ratio is greater than about 1.75. In a preferred embodiment, a display having non-spherical capsules has a volume fraction (i.e., fraction of total volume) of binder between about 0 to about 0.9. More preferably, the volume fraction is between about 0.05 and about 0.2.

Displays of this type have both a rear surface and a viewed surface. In a preferred embodiment, the viewed surface is substantially planar. As used herein, the phrase "substantially planar" means a curvature (i.e., inverse of a radius of curvature) of less than about 2.0 m. In a particularly preferred embodiment, both the rear and viewed surfaces are substantially planar. Furthermore, embodiments of such displays will preferably have an optically active fraction (i.e., percentage of total surface area that can change optical properties) of greater than about 80%, and more preferably greater than about 90%.

Non-spherical microcapsules or droplets can be formed during the encapsulation phase, by, for example, using a non-uniform shear field or a compressive pressure. Such non-spherical capsules or droplets can also be formed during the processing of the display when the binder is drying or curing. In such a system, as the binder shrinks, it pulls capsules or droplets close to one another and pulls the capsules or droplets down toward the substrate on which they have been coated. For example, an aqueous evaporative binder, such as a waterborne acrylic, urethane, or poly (vinyl alcohol), for example, tends to exhibit such shrinking properties. Any other evaporative binder, emulsion, or solution would also be suitable. The solvent need not be water, but can be an organic liquid or a combination of liquids.

Such non-spherical capsules or droplets can be formed by applying a force to the film as it is drying or curing to deform permanently the capsules or droplets. Such a force can be applied by a pair of rollers, by a vacuum lamination press, by a mechanical press, or by any other suitable means. Such non-spherical capsules or droplets can also be formed by stretching the cured film in one or both of the planar axes of the film. After completion of the curing process, the capsule can protrude above the surface of the cured film resulting in a lens effect that enhances the optical properties of the capsule. Finally, the capsule can also be of a material which softens in the binder, thus allowing a flattened capsule when the capsules and binder are laid down and the binder is allowed to cure.

In another embodiment, a polymer-dispersed electrophoretic display is constructed in a manner similar to a polymer-dispersed liquid crystal display. As the binder dries or cures, the encapsulated phase is pulled into non-spherical cavities.

An electrophoretic display is constructed as either an encapsulated electrophoretic display or a polymer-dispersed electrophoretic display (similar in construction to a polymer dispersed liquid crystal display), and the capsules or liquid droplets are formed non-spherically, by flattening, by shrinkage of the binder, or by mechanical force. In each case, the capsules should be capable of deforming, or they may rupture. In the case of a polymer-dispersed electrophoretic display, the encapsulated phases change shape as the polymer shrinks. In addition, the encapsulated phases may be deformed asymmetrically by stretching the substrate. Another technique which may be employed is to first dry the binder in such a way that a tough top skin is formed. The rest of the binder may then be dried slowly with no fear of the top surface breaking or becoming too uneven.

The electrodes adjacent the electrophoretic display may include conducting polymers, such as polyaniline, for example. These materials may be soluble, enabling them to be coated by, for example, web coating.

Figure 20:
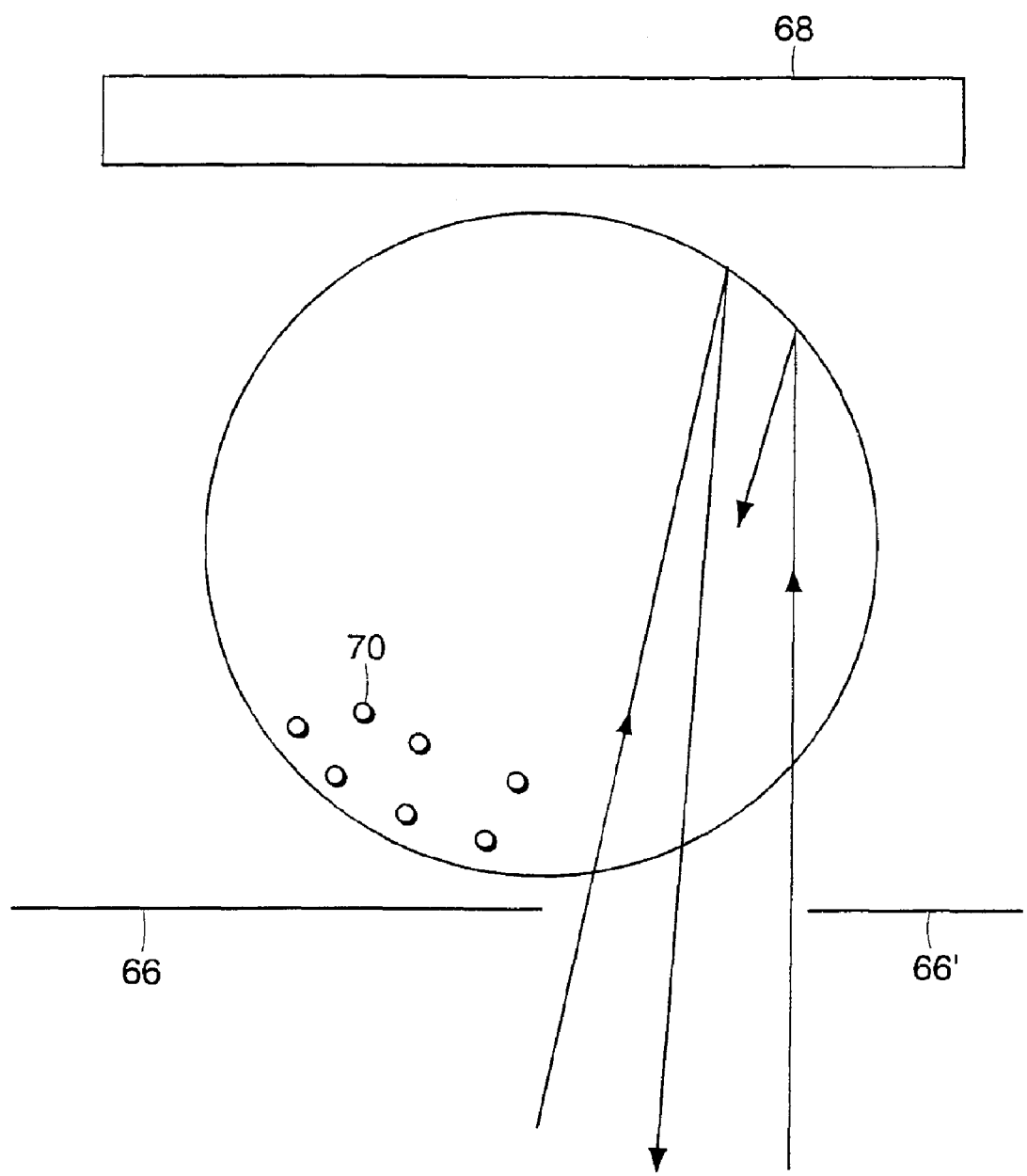
FIG. 20 shows a capsule disposed adjacent a reflective substrate and two electrodes, in which the particles within the capsule are aligned so as to allow light to pass through the capsule and be reflected by the substrate.

A means for addressing an encapsulated electrophoretic display (or other display) structure is also described. Referring to FIG. 20, electrodes 66 and 66' are present on one side of the display. These electrodes may be part of a head ("stylus") which is scanned over the display. There may be more, less, or exactly one capsule per electrode pair. Application of a DC field to the pixel moves the particles to one side and exposes substrate 68 beneath (e.g., a mirror, a retroreflective coating, a diffuse reflective coating, etc.). Under the influence of an AC field, the particles 70 may be distributed throughout the space and cause a largely dark pixel appearance. The electrodes themselves may be clear or opaque.

Figure 21A:
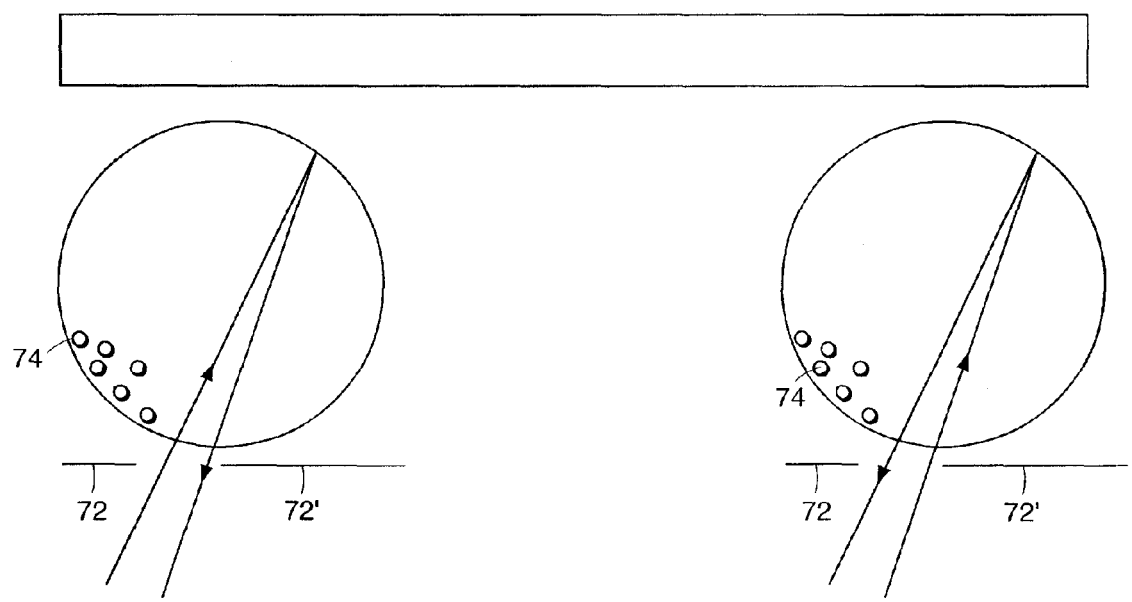
FIG. 21A shows two capsules in a binder disposed adjacent a reflective substrate and two electrodes, in which the particles within the capsule are aligned so as to allow light to pass through the capsule and be reflected by the substrate.
Figure 21B:
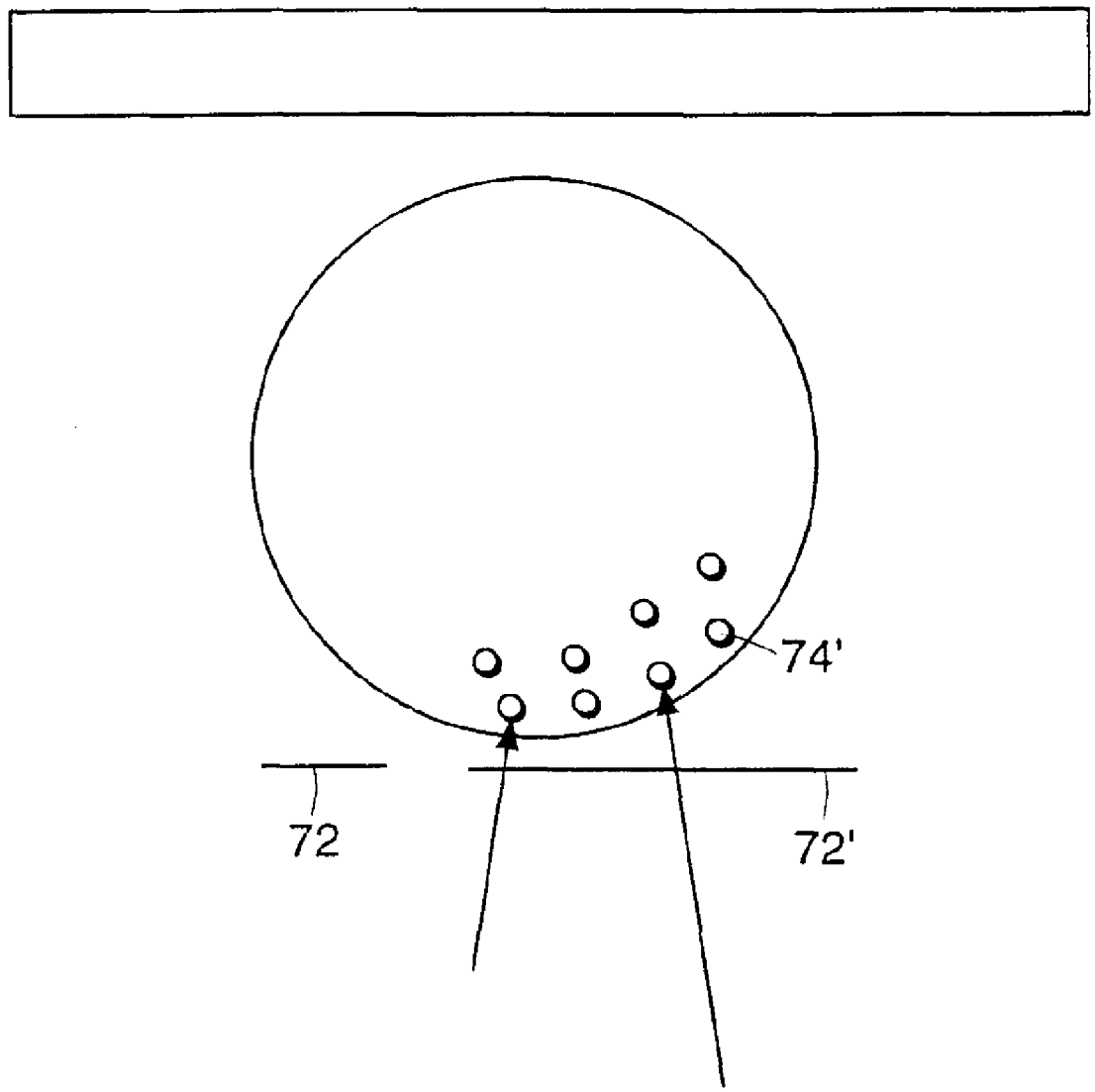
FIG. 21B shows a capsule disposed adjacent a reflective substrate and two electrodes, in which the particles within the capsule are aligned so as to prevent light from passing through the capsule and being reflected by the substrate.

Referring to FIGS. 21A and 21B, a similar structure is described. The electrodes 72 and 72' are, however, different in size (e.g., more than a factor of 2). The particles are moved to mask either electrode by changing the electric field polarity. In one case (FIG. 21A), the particles cover a small area, and the pixel is largely reflective. In the other case (FIG. 21B), the particles 74' cover a large area, and the pixel is largely absorbing. The materials may be reversed, for example reflective particles and an absorbing backing. There may be a mask which covers one of the electrode locations on the material.

This method of addressing a display includes writing with an electrostatic head either permanently mounted in a fixture or hand held. It may also be applied to an encapsulated magnetophoretic material. It may also be applied to a polymer stabilized liquid crystal technology, or a bistable liquid crystal material of any type, for example, nematic on a photo-aligned layer. It may also be applied to a suspended particle display.

Referring again to both FIGS. 20 and 21, in either embodiment, the rear electrode may also be provided as a transmissive, translucent, or otherwise transparent backing, instead of reflective. In these embodiments, a DC field may cause dark (absorbing) particles to cover one electrode, as described above, and the pixel is largely transmissive. These embodiments allow the display to be used to "shutter" light. For example, a display including the described capsules may be addressed so that all of the pixels present in the display are largely transparent, in which case the display would act as a window or clear device. Alternatively, if a fraction of the capsules are addressed, the display is partially transmissive. If all of the capsules are addressed using an AC field, the display is either opaque or reflective.

In an electrophoretic display of the present invention, the continuous phase surrounds the droplets and separates the two electrodes. This continuous phase must be compatible with the droplets and electrodes and should possess properties that allow for facile printing or coating. It may also possess barrier properties for water, oxygen, ultraviolet light, the electrophoretic fluid, or other materials, Further, it may contain surfactants and cross-linking agents, which could aid in coating or durability.

The following Sections A-D describe useful materials for the various components of the electrophoretic displays of the present invention.

A. Electrophoretic Particles

There is much flexibility in the choice of particles for use in electrophoretic displays. For purposes of this invention, a particle is any component that is charged or capable of acquiring a charge (i.e., has or is capable of acquiring electrophoretic mobility), and, in some cases, this mobility may be zero or close to zero (i.e., the particles will not move). The particles may be neat pigments, dyed (laked) pigments or pigment/polymer composites, or any other component that is charged or capable of acquiring a charge. Typical considerations for the electrophoretic particle are its optical properties, electrical properties, and surface chemistry. The particles may be organic or inorganic compounds, and they may either absorb light or scatter light. The particles for use in the invention may further include scattering pigments, absorbing pigments and luminescent particles. The particles may be retroreflective, such as corner cubes, or they may be electroluminescent, such as zinc sulfide particles, which emit light when excited by an AC field, or they may be photoluminescent. Zinc sulfide electroluminescent particles may be encapsulated with an insulative coating to reduce electrical conduction. Finally, the particles may be surface treated so as to improve charging or interaction with a charging agent, or to improve dispersibility.

One particle for use in electrophoretic displays of the invention is titania. The titania particles may be coated with a metal oxide, such as aluminum oxide or silicon oxide, for example. The titania particles may have one, two, or more layers of metal-oxide coating. For example, a titania particle for use in electrophoretic displays of the invention may have a coating of aluminum oxide and a coating of silicon oxide. The coatings may be added to the particle in any order.

The electrophoretic particle is usually a pigment, a polymer, a laked pigment, or some combination of the above. A neat pigment can be any pigment, and, usually for a light colored particle, pigments such as rutile (titania), anatase (titania), barium sulfate, kaolin, or zinc oxide are useful. Some typical particles have high refractive indices, high scattering coefficients, and low absorption coefficients. Other particles are absorptive, such as carbon black or colored pigments used in paints and inks. The pigment should also be insoluble in the suspending fluid. Yellow pigments such as diarylide yellow, Hansa yellow, and benzidin yellow have also found use in similar displays. Any other reflective material can be employed for a light colored particle, including non-pigment materials, such as metallic particles.

Useful neat pigments include, but are not limited to, PbCrO4, Cyan blue GT 55-3295 (American Cyanamid Company, Wayne, N.J.), Cibacron Black BG (Ciba Company, Inc., Newport, Del.), Cibacron Turquoise Blue G (Ciba), Cibalon Black BGL (Ciba), Orasol Black BRG (Ciba), Orasol Black RBL (Ciba), Acetamine Black, CBS (E. I. du Pont de Nemours and Company, Inc., Wilmington, Del., hereinafter abbreviated "du Pont"), Crocein Scarlet N Ex (du Pont) (27290), Fiber Black VF (du Pont) (30235), Luxol Fast Black L (du Pont) (Solv. Black 17), Nirosine Base No. 424 (du Pont) (50415 B), Oil Black BG (du Pont) (Solv. Black 16), Rotalin Black RM (du Pont), Sevron Brilliant Red 3 B (du Pont); Basic Black DSC (Dye Specialties, Inc.), Hectolene Black (Dye Specialties, Inc.), Azosol Brilliant Blue B (GAF, Dyestuff and Chemical Division, Wayne, N.J.) (Solv. Blue 9), Azosol Brilliant Green BA (GAF) (Solv. Green 2), Azosol Fast Brilliant Red B (GAF), Azosol Fast Orange RAConc. (GAF) (Solv. Orange 20), Azosol Fast Yellow GRA Conc. (GAF) (13900 A), Basic Black KMPA (GAF), Benzofix Black CW-CF (GAF) (35435), Cellitazol BNFV Ex Soluble CF (GAF) (Disp. Black 9), Celliton Fast Blue AF Ex Conc (GAF) (Disp. Blue 9), Cyper Black Iowa (GAF) (Basic Black 3), Diamine Black CAP Ex Conc (GAF) (30235), Diamond Black EAN Hi Con. CF (GAF) (15710), Diamond Black PBBA Ex (GAF) (16505); Direct Deep Black EA Ex CF (GAF) (30235), Hansa Yellow G (GAF) (11680); Indanthrene Black BBK Powd. (GAF) (59850), Indocarbon CLGS Conc. CF (GAF) (53295), Katigen Deep Black NND Hi Conc. CF (GAF) (15711), Rapidogen Black 3 G (GAF) (Azoic Black 4); Sulphone Cyanine Black BA-CF (GAF) (26370), Zambezi Black VD Ex Conc. (GAF) (30015); Rubanox Red CP-1495 (The Sherwin-Williams Company, Cleveland, Ohio) (15630); Raven 11 (Columbian Carbon Company, Atlanta, Ga.), (carbon black aggregates with a particle size of about 25 μm), Statex B-12 (Columbian Carbon Co.) (a furnace black of 33 μm average particle size), and chrome green.

Particles may also include laked, or dyed, pigments. Laked pigments are particles that have a dye precipitated on them or which are stained. Lakes are metal salts of readily soluble anionic dyes. These are dyes of azo, triphenylmethane or anthraquinone structure containing one or more sulphonic or carboxylic acid groupings. They are usually precipitated by a calcium, barium or aluminum salt onto a substrate. Typical examples are peacock blue lake (CI Pigment Blue 24) and Persian orange (lake of CI Acid Orange 7), Black M Toner (GAF) (a mixture of carbon black and black dye precipitated on a lake).

A dark particle of the dyed type may be constructed from any light absorbing material, such as carbon black, or inorganic black materials. The dark material may also be selectively absorbing. For example, a dark green pigment may be used. Black particles may also be formed by staining latices with metal oxides, such latex copolymers consisting of any of butadiene, styrene, isoprene, methacrylic acid, methyl methacrylate, acrylonitrile, vinyl chloride, acrylic acid, sodium styrene sulfonate, vinyl acetate, chlorostyrene, dimethylaminopropylmethacrylamide, isocyanoethyl methacrylate and N-(isobutoxymethacrylamide), and optionally including conjugated diene compounds such as diacrylate, triacrylate, dimethylacrylate and trimethacrylate. Black particles may also be formed by a dispersion polymerization technique.

In the systems containing pigments and polymers, the pigments and polymers may form multiple domains within the electrophoretic particle, or be aggregates of smaller pigment/polymer combined particles. Alternatively, a central pigment core may be surrounded by a polymer shell. The pigment, polymer, or both can contain a dye. The optical purpose of the particle may be to scatter light, absorb light, or both. Useful sizes may range from 1 nm up to about 100 μm, as long as the particles are smaller than the bounding capsule. The density of the electrophoretic particle may be substantially matched to that of the suspending (i.e., electrophoretic) fluid. As defined herein, a suspending fluid has a density that is "substantially matched" to the density of the particle if the difference in their respective densities is between about zero and about two grams/milliliter ("g/ml"). This difference is preferably between about zero and about 0.5 g/ml.

Useful polymers for the particles include, but are not limited to: polystyrene, polyethylene, polypropylene, phenolic resins, du Pont Elvax resins (ethylene-vinyl acetate copolymers), polyesters, polyacrylates, polymethacrylates, ethylene acrylic acid or methacrylic acid copolymers (Nucrel Resins du Pont, Primacor Resins Dow Chemical), acrylic copolymers and terpolymers (Elvacite Resins du Pont) and PMMA. Useful materials for homopolymer/pigment phase separation in high shear melt include, but are not limited to, polyethylene, polypropylene, poly(methyl methacrylate), poly(isobutyl methacrylate), polystyrene, polybutadiene, polyisoprene, polyisobutylene, poly(lauryl methacrylate), poly(stearyl methacrylate), poly(isobornyl methacrylate), poly(t-butyl methacrylate), poly(ethyl methacrylate), poly(methyl acrylate), poly(ethyl acrylate), polyacrylonitrile, and copolymers of two or more of these materials. Some useful pigment/polymer complexes that are commercially available include, but are not limited to, Process Magenta PM 1776 (Magruder Color Company, Inc., Elizabeth, N.J.), Methyl Violet PMA VM6223 (Magruder Color Company, Inc., Elizabeth, N.J.), and Naphthol FGR RF6257 (Magruder Color Company, Inc., Elizabeth, N.J.).

The pigment-polymer composite may be formed by a physical process, (e.g., attrition or ball milling), a chemical process (e.g., microencapsulation or dispersion polymerization), or any other process known in the art of particle production. For example, the processes and materials for both the fabrication of liquid toner particles and the charging of those particles may be relevant.

New and useful electrophoretic particles may still be discovered, but a number of particles already known to those skilled in the art of electrophoretic displays and liquid toners can also prove useful. In general, the polymer requirements for liquid toners and electrophoretic inks are similar, in that the pigment or dye must be easily incorporated therein, either by a physical, chemical, or physicochemical process, may aid in the colloidal stability, and may contain charging sites or may be able to incorporate materials which contain charging sites. One general requirement from the liquid toner industry that is not shared by electrophoretic inks is that the toner must be capable of "fixing" the image, i.e., heat fusing together to create a uniform film after the deposition of the toner particles.

Typical manufacturing techniques for particles may be drawn from the liquid toner and other arts and include ball milling, attrition, jet milling, etc. The process will be illustrated for the case of a pigmented polymeric particle. In such a case the pigment is compounded in the polymer, usually in some kind of high shear mechanism such as a screw extruder. The composite material is then (wet or dry) ground to a starting size of around 10 μm. It is then dispersed in a carrier liquid, for example ISOPAR (Exxon, Houston, Tex.), optionally with some charge control agent(s), and milled under high shear for several hours down to a final particle size and/or size distribution.

Another manufacturing technique for particles is to add the polymer, pigment, and suspending fluid to a media mill. The mill is started and simultaneously heated to a temperature at which the polymer swells substantially with the solvent. This temperature is typically near 100° C. In this state, the pigment is easily encapsulated into the swollen polymer. After a suitable time, typically a few hours, the mill is gradually cooled back to ambient temperature while stirring. The milling may be continued for some time to achieve a small enough particle size, typically a few microns in diameter. The charging agents may be added at this time. Optionally, more suspending fluid may be added.

Chemical processes such as dispersion polymerization, mini- or micro-emulsion polymerization, suspension polymerization precipitation, phase separation, solvent evaporation, in situ polymerization, seeded emulsion polymerization, or any process which falls under the general category of microencapsulation may be used. A typical process of this type is a phase separation process wherein a dissolved polymeric material is precipitated out of solution onto a dispersed pigment surface through solvent dilution, evaporation, or a thermal change. Other processes include chemical means for staining polymeric latices, for example with metal oxides or dyes.

B. Suspending Fluid

The suspending fluid containing the particles can be chosen based on properties such as density, refractive index, and solubility. A preferred suspending fluid has a low dielectric constant (about 2), high volume resistivity (about 1015 ohm-cm), low viscosity (less than 5 centistokes ("cst")), low toxicity and environmental impact, low water solubility (less than 10 parts per million ("ppm")), high specific gravity (greater than 1.5), a high boiling point (greater than 90° C.), and a low refractive index (less than 1.2).

The choice of suspending fluid may be based on concerns of chemical inertness, density matching to the electrophoretic particle, or chemical compatibility with both the electrophoretic particle and the continuous phase. The viscosity of the fluid should be low when movement of the particles is desired. The refractive index of the suspending fluid may also be substantially matched to that of the particles. As used herein, the refractive index of a suspending fluid "is substantially matched" to that of a particle if the difference between their respective refractive indices is between about zero and about 0.3, and is preferably between about 0.05 and about 0.2.

Additionally, the fluid may be chosen to be a poor solvent for some polymers, which is advantageous for use in the fabrication of microparticles, because it increases the range of polymeric materials useful in fabricating particles of polymers and pigments. Organic solvents, such as halogenated organic solvents, saturated linear or branched hydrocarbons, silicone oils, and low molecular weight halogen-containing polymers are some useful suspending fluids. The suspending fluid may comprise a single fluid. The fluid will, however, often be a blend of more than one fluid in order to tune its chemical and physical properties. Furthermore, the fluid may contain surface modifiers to modify the surface energy or charge of the electrophoretic particle or bounding capsule. Reactants or solvents for the microencapsulation process (oil soluble monomers, for example) can also be contained in the suspending fluid. Charge control agents can also be added to the suspending fluid.

Useful organic solvents include, but are not limited to, epoxides, such as decane epoxide and dodecane epoxide; vinyl ethers, such as cyclohexyl vinyl ether and Decave® (International Flavors & Fragrances, Inc., New York, N.Y.); and aromatic hydrocarbons, such as toluene and naphthalene. Useful halogenated organic solvents include, but are not limited to, tetrafluorodibromoethylene, tetrachloroethylene, trifluorochloroethylene, 1,2,4-trichlorobenzene and carbon tetrachloride. These materials have high densities. Useful hydrocarbons include, but are not limited to, dodecane, tetradecane, the aliphatic hydrocarbons in the Isopar® series (Exxon, Houston, Tex.), Norpar® (a series of normal paraffinic liquids), Shell-Sol® (Shell, Houston, Tex.), and Sol-Trol® (Shell), naphtha, and other petroleum solvents. These materials usually have low densities. Useful examples of silicone oils include, but are not limited to, octamethyl cyclosiloxane and higher molecular weight cyclic siloxanes, poly(methyl phenyl siloxane), hexamethyldisiloxane, and polydimethylsiloxane. These materials usually have low densities. Useful low molecular weight halogen-containing polymers include, but are not limited to, poly(chlorotrifluoroethylene) polymer (Halogenated Hydrocarbon Inc., River Edge, N.J.), Galden® (a perfluorinated ether from Ausimont, Moristown, N.J.), or Krytox® from du Pont (Wilmington, Del.). In a preferred embodiment, the suspending fluid is a poly(chlorotrifluoroethylene) polymer. In a particularly preferred embodiment, this polymer has a degree of polymerization from about 2 to about 10. Many of the above materials are available in a range of viscosities, densities, and boiling points.

The fluid must be capable of being formed into small droplets prior to combination with the continuous phase. Processes for forming small droplets include flow-through jets, membranes, nozzles, or orifices, as well as shear-based emulsifying schemes. The formation of small drops may be assisted by electrical or sonic fields. As already mentioned, surfactants, and possibly also polymers, can be used to aid in the stabilization and emulsification of the droplets.

It can be advantageous in some displays for the suspending fluid to contain an optically absorbing dye. This dye must be soluble in the fluid, but will generally be insoluble in the other components of the capsule. There is much flexibility in the choice of dye material. The dye can be a pure compound, or blends of dyes to achieve a particular color, including black. The dyes can be fluorescent, which would produce a display in which the fluorescence properties depend on the position of the particles. The dyes can be photoactive, changing to another color or becoming colorless upon irradiation with either visible or ultraviolet light, providing another means for obtaining an optical response. Dyes could also be polymerizable by, for example, thermal, photochemical or chemical diffusion processes, forming a solid absorbing polymer inside the droplet.

There are many dyes that can be used in electrophoretic displays. Properties important here include light fastness, solubility in the suspending liquid, color, and cost. These dyes are generally chosen from the classes of azo, anthraquinone, and triphenylmethane type dyes and may be chemically modified so as to increase their solubility in the oil phase and reduce their adsorption by the particle surface.

A number of dyes already known to those skilled in the art of electrophoretic displays will prove useful. Useful azo dyes include, but are not limited to: the Oil Red dyes, and the Sudan Red and Sudan Black series of dyes. Useful anthraquinone dyes include, but are not limited to: the Oil Blue dyes, and the Macrolex Blue series of dyes. Useful triphenylmethane dyes include, but are not limited to, Michler's hydrol, Malachite Green, Crystal Violet, and Auramine O.

C. Charge Control Agents and Particle Stabilizers

Charge control agents are used to provide good electrophoretic mobility to the electrophoretic particles. Stabilizers are used to prevent agglomeration of the electrophoretic particles, as well as prevent the electrophoretic particles from irreversibly depositing onto the droplet wall. Either component can be constructed from materials across a wide range of molecular weights (low molecular weight, oligomeric, or polymeric), and may be a single pure compound or a mixture. The charge control agent used to modify and/or stabilize the particle surface charge is applied as generally known in the arts of liquid toners, electrophoretic displays, non-aqueous paint dispersions, and engine-oil additives. In all of these arts, charging species may be added to non-aqueous media in order to increase electrophoretic mobility or increase electrostatic stabilization. The materials can improve steric stabilization as well. Different theories of charging are postulated, including selective ion adsorption, proton transfer, and contact electrification.

An optional charge control agent or charge director may be used. These constituents typically consist of low molecular weight surfactants, polymeric agents, or blends of one or more components and serve to stabilize or otherwise modify the sign and/or magnitude of the charge on the electrophoretic particles. The charging properties of the pigment itself may be accounted for by taking into account the acidic or basic surface properties of the pigment, or the charging sites may take place on the carrier resin surface (if present), or a combination of the two. Additional pigment properties which may be relevant are the particle size distribution, the chemical composition, and the lightfastness.

Charge adjuvants may also be added. These materials increase the effectiveness of the charge control agents or charge directors. The charge adjuvant may be a polyhydroxy compound or an aminoalcohol compound, and is preferably soluble in the suspending fluid in an amount of at least 2% by weight. Examples of polyhydroxy compounds which contain at least two hydroxyl groups include, but are not limited to, ethylene glycol, 2,4,7,9-tetramethyldecyne-4,7-diol, poly(propylene glycol), pentaethylene glycol, tripropylene glycol, triethylene glycol, glycerol, pentaerythritol, glycerol tris (12-hydroxystearate), propylene glycerol monohydroxystearate, and ethylene glycol monohydroxystearate. Examples of aminoalcohol compounds which contain at least one alcohol function and one amine function in the same molecule include, but are not limited to, triisopropanolamine, triethanolamine, ethanolamine, 3-amino-1-propanol, o-aminophenol, 5-amino-1-pentanol, and tetrakis(2-hydroxyethyl)ethylenediamine The charge adjuvant is preferably present in the suspending fluid in an amount of about 1 to about 100 milligrams per gram ("mg/g") of the particle mass, and more preferably about 50 to about 200 mg/g.

The surface of the particle may also be chemically modified to aid dispersion, to improve surface charge, and to improve the stability of the dispersion, for example. Surface modifiers include organic siloxanes, organohalogen silanes and other functional silane coupling agents (Dow Corning® Z-6070, Z-6124, and 3 additive, Midland, Mich.); organic titanates and zirconates (Tyzor® TOT, TBT, and TE Series, du Pont); hydrophobing agents, such as long chain (C12 to C50) alkyl and alkyl benzene sulphonic acids, fatty amines or diamines and their salts or quaternary derivatives; and amphipathic polymers which can be covalently bonded to the particle surface.

In general, it is believed that charging results as an acid-base reaction between some moiety present in the continuous phase and the particle surface. Thus useful materials are those which are capable of participating in such a reaction, or any other charging reaction as known in the art.

Different non-limiting classes of charge control agents which are useful include organic sulfates or sulfonates, metal soaps, block or comb copolymers, organic amides, organic zwitterions, and organic phosphates and phosphonates. Useful organic sulfates and sulfonates include, but are not limited to, sodium bis(2-ethylhexyl) sulfosuccinate, calcium dodecylbenzenesulfonate, calcium petroleum sulfonate, neutral or basic barium dinonylnaphthalenesulfonate, neutral or basic calcium dinonylnaphthalenesulfonate, dodecylbenzenesulfonic acid sodium salt, and ammonium lauryl sulfate. Useful metal soaps include, but are not limited to, basic or neutral barium petronate, calcium petronate, Co-, Ca-, Cu-, Mn-, Ni-, Zn-, and Fe-salts of naphthenic acid, Ba-, Al-, Zn-, Cu-, Pb-, and Fe-salts of stearic acid, divalent and trivalent metal carboxylates, such as aluminum tristearate, aluminum octanoate, lithium heptanoate, iron stearate, iron distearate, barium stearate, chromium stearate, magnesium octanoate, calcium stearate, iron naphthenate, zinc naphthenate, Mn- and Zn-heptanoate, and Ba-, Al-, Co-, Mn-, and Zn-octanoate. Useful block or comb copolymers include, but are not limited to, AB diblock copolymers of (A) polymers of 2-(N,N-dimethylamino)ethyl methacrylate quaternized with methyl p-toluenesulfonate and (B) poly(2-ethylhexyl methacrylate), and comb graft copolymers with oil soluble tails of poly(12-hydroxystearic acid) and having a molecular weight of about 1800, pendant on an oil-soluble anchor group of poly(methyl methacrylate-methacrylic acid). Useful organic amides include, but are not limited to, polyisobutylene succinimides such as OLOA 1200, and N-vinylpyrrolidone polymers. Useful organic zwitterions include, but are not limited to, lecithin. Useful organic phosphates and phosphonates include, but are not limited to, the sodium salts of phosphated mono- and di-glycerides with saturated and unsaturated acid substituents.

Particle dispersion stabilizers may be added to prevent particle flocculation or attachment to the droplet walls. For the typical high resistivity liquids used as suspending fluids in electrophoretic displays, non-aqueous surfactants may be used. These include, but are not limited to, glycol ethers, acetylenic glycols, alkanolamides, sorbitol derivatives, alkyl amines, quaternary amines, imidazolines, dialkyl oxides, and sulfosuccinates.

D. Droplet Formation

Figure 22A:
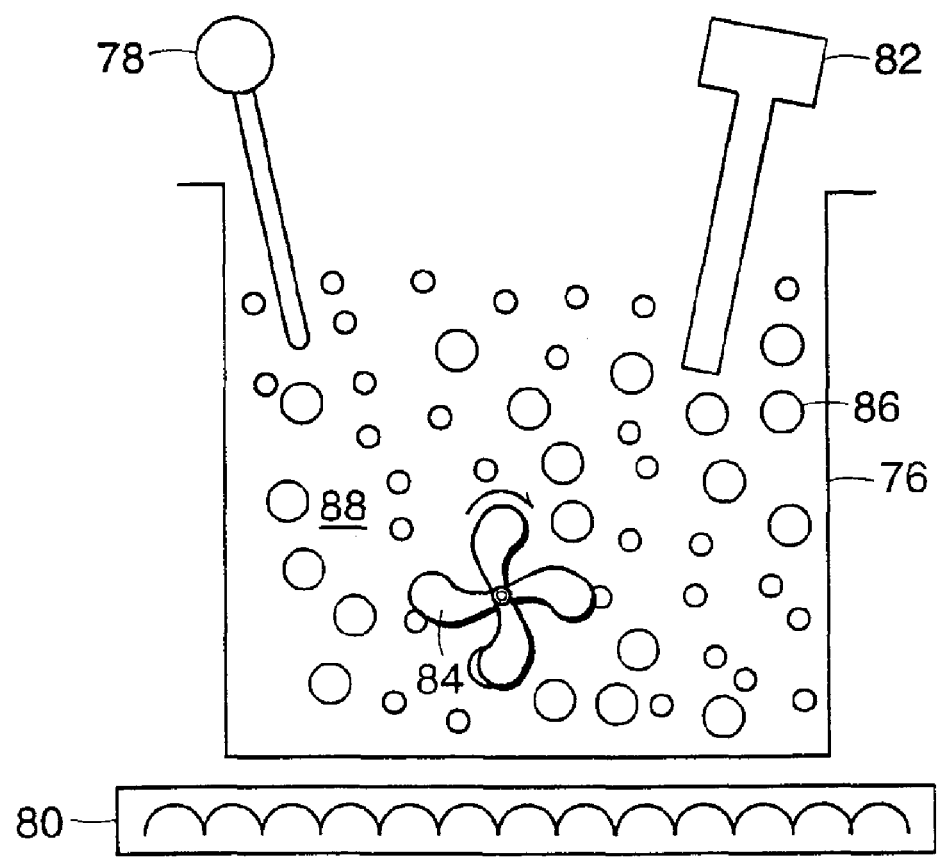
FIG. 22A is an illustration of an apparatus for performing emulsion-based encapsulation.

FIG. 22A illustrates an exemplary apparatus and environment for performing emulsion-based encapsulation. An oil/water emulsion is prepared in a vessel 76 equipped with a device 78 for monitoring and a device 80 for controlling the temperature. A pH monitor 82 may also be included. An impeller 84 maintains agitation throughout the encapsulation process, and in combination with emulsifiers, can be used to control the size of the emulsion droplets 86 that will lead to the finished capsules or polymer-dispersed droplets. The aqueous continuous phase 88 may contain, for example, a prepolymer and various system modifiers.

Figure 22B:
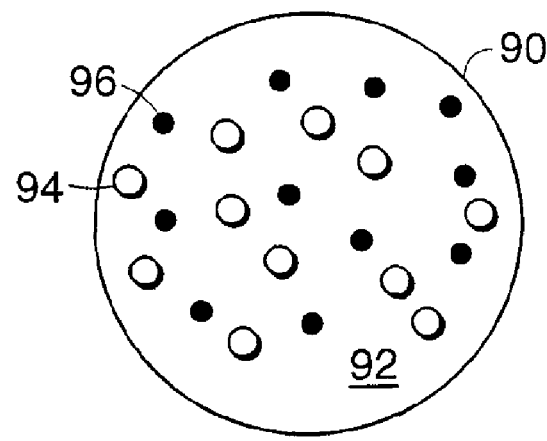
FIG. 22B is an illustration of an oil drop of suspending fluid having white and black particles dispersed within it.

FIG. 22B illustrates an oil drop 90 comprising a substantially transparent suspending fluid 92, in which is dispersed white microparticles 94 and black particles 96. Preferably, particles 94 and 96 have densities substantially matched to the density of suspending fluid 92. The liquid phase may also contain some threshold/bistability modifiers, charge control agents, and/or hydrophobic monomers.

Figure 22C:
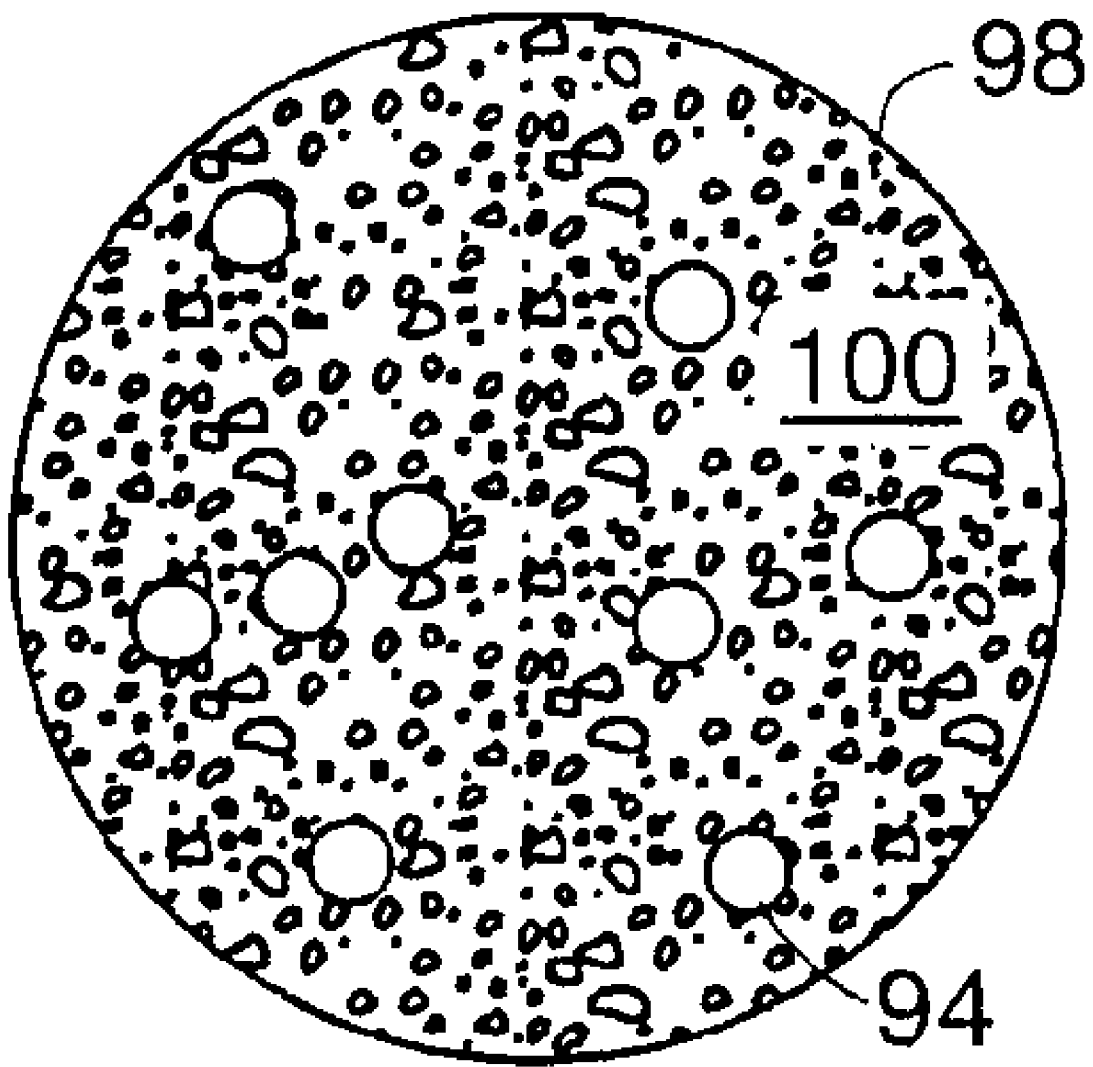
FIG. 22C is an illustration of an oil drop of darkly dyed suspending fluid having white microparticles and charge control agents dispersed within it.

FIG. 22C illustrates a similar oil drop 98 comprising a darkly dyed suspending fluid 100 containing a dispersion of white particles and appropriate charge control agents.

Like other encapsulated electrophoretic displays, the electrophoretic displays of the present invention provide flexible, reflective displays that can be manufactured easily and consume little power (or no power in the case of bistable displays in certain states). Such displays, therefore, can be incorporated into a variety of applications and can take on many forms. Once the electric field is removed, the electrophoretic particles can be generally stable. Additionally, providing a subsequent electric charge can alter a prior configuration of particles. As discussed in more detail below, such displays may include, for example, a plurality of anisotropic particles and a plurality of second particles in a suspending fluid. Application of a first electric field may cause the anisotropic particles to assume a specific orientation and present an optical property. Application of a second electric field may then cause the plurality of second particles to translate, thereby disorienting the anisotropic particles and disturbing the optical property. Alternatively, the orientation of the anisotropic particles may allow easier translation of the plurality of second particles. Alternatively or in addition, the particles may have a refractive index that substantially matches the refractive index of the suspending fluid.

As already mentioned, an electrophoretic display can be constructed so that the optical state of the display is stable for some length of time. When the display has two states that are stable in this manner, the display is bistable, within the meaning of that term as previously defined; if more than two states of the display are stable, then the display is multistable. However, whether a display is effectively bistable state depends upon the display's application. A slowly decaying optical state can be effectively bistable if the optical state is substantially unchanged over the required viewing time. For example, in a display that is updated every few minutes, a display image that is stable for hours or days is effectively bistable for a particular application. Alternatively, it is possible to construct electrophoretic displays in which the image decays quickly once the addressing voltage to the display is removed (i.e., the display is not bistable or multistable). Whether or not an electrophoretic display is bistable, and its degree of bistability, can be controlled through appropriate chemical modification of the electrophoretic particles, the suspending fluid, and the continuous phase material.

An electrophoretic display may take many forms. The particles within the capsules of such a display may be colored, luminescent, light-absorbing or transparent, for example.

While the invention has been particularly shown and described with reference to specific preferred embodiments, it should be understood by those skilled in the art that various changes in form and detail may be made therein without departing from the spirit and scope of the invention as defined by the appended claims.

The invention claimed is:

1. A two-phase electrophoretic medium comprising a solid continuous phase and a discontinuous phase, the discontinuous phase comprising a plurality of droplets, each of which comprises a suspending fluid and at least one particle disposed within the suspending fluid and capable of moving through the fluid upon application of an electric field to the electrophoretic medium, the solid continuous phase surrounding and encapsulating the discontinuous phase, wherein said droplets comprise at least two types of particles differing in at least one of charge polarity and electrophoretic mobility, and wherein said suspending fluid is uncolored.

2. A two-phase electrophoretic medium according to claim 1 wherein said suspending fluid is selected from organic solvents, halogenated solvents, halogenated polymers, silicone oils, linear hydrocarbons, branched hydrocarbons, and mixtures thereof.

3. A two-phase electrophoretic medium according to claim 1 wherein said particles comprises one or more of neat pigments, dyed pigments, laked pigments, and pigment/polymer composites.

4. A two-phase electrophoretic medium according to claim 1 wherein said continuous phase comprises a radiation-cured material.

5. A two-phase electrophoretic medium according to claim 1 wherein said continuous phase comprises a polymer.

6. A two-phase electrophoretic medium according to claim 5 wherein said continuous phase comprises any one or more of poly(vinylpyrrolidone), polyacrylamide, poly(N-iso-propylacrylamide), poly(methacrylamide), poly(ethylene glycol), poly(ethylene oxide), poly(vinylpyrrolidone-co-vinyl acetate) and poly(vinyl alcohol).

7. A process for producing a two-phase electrophoretic medium, this process comprising:

providing a liquid medium comprising a film-forming material;

dispersing in the liquid medium a plurality of droplets, each of which comprises a suspending fluid and at least one particle disposed within the suspending fluid and capable of moving through the fluid upon application of an electric field thereby forming a droplet-containing liquid medium; and subjecting the droplet-containing liquid medium to conditions effective to cause the film-forming material therein to form a solid film, and thereby producing a two-phase electrophoretic medium in which the film-forming material forms a continuous phase surrounding and encapsulating the droplets, which form the discontinuous phase of the electrophoretic medium, wherein said continuous phase comprises a major proportion of a polymer and a minor proportion of an emulsifier, wherein the emulsifier comprises gelatin.

* * * * *